United States Patent
Kundu et al.

(10) Patent No.: US 9,892,438 B1
(45) Date of Patent: Feb. 13, 2018

(54) NOTIFICATION SYSTEM AND METHODS FOR USE IN RETAIL ENVIRONMENTS

(71) Applicants: Malay Kundu, Lexington, MA (US); Joshua Migdal, Wayland, MA (US)

(72) Inventors: Malay Kundu, Lexington, MA (US); Joshua Migdal, Wayland, MA (US)

(73) Assignee: Stoplift, Inc., Cambridge, MA (US)

( * ) Notice: Subject to any disclaimer, the term of this patent is extended or adjusted under 35 U.S.C. 154(b) by 432 days.

(21) Appl. No.: 13/886,643

(22) Filed: May 3, 2013

Related U.S. Application Data

(60) Provisional application No. 61/642,296, filed on May 3, 2012, provisional application No. 61/642,740, filed on May 4, 2012.

(51) Int. Cl.
G06Q 30/06 (2012.01)
G06F 17/00 (2006.01)

(52) U.S. Cl.
CPC .................. *G06Q 30/0609* (2013.01)

(58) Field of Classification Search
USPC .......................................................... 705/23
See application file for complete search history.

(56) References Cited

U.S. PATENT DOCUMENTS

| | | | |
|---|---|---|---|
| 6,032,128 A * | 2/2000 | Morrison | A47F 9/048 186/61 |
| 2004/0093281 A1 * | 5/2004 | Silverstein | G06Q 20/04 705/26.8 |
| 2006/0064384 A1 * | 3/2006 | Mehrotra | G01S 3/7864 705/57 |
| 2009/0207269 A1 | 8/2009 | Yoda | |
| 2011/0012925 A1 * | 1/2011 | Luo | G06F 3/0386 345/636 |

FOREIGN PATENT DOCUMENTS

EP 2290628 A1 2/2011

OTHER PUBLICATIONS

Supplementary Partial European Search Report, EP12804711.

* cited by examiner

*Primary Examiner* — Garcia Ade
(74) *Attorney, Agent, or Firm* — Chapin IP Law, LLC

(57) ABSTRACT

A scan avoidance monitoring system detects instances in which a respective customer in a retail environment fails to properly scan or tally one or more retail items for purchase. To avoid generating false positives, such as flagging of events as scan avoidances when they really are not or likely are not scan avoidances, the scan avoidance system can be configured to require a level of confirmation by one or more other analyzers to flag a particular circumstance as a scan avoidance.

9 Claims, 10 Drawing Sheets

NOTIFICATION SYSTEM AND METHODS FOR USE IN RETAIL ENVIRONMENTS

RELATED APPLICATIONS

This application is related to and claims the benefit of earlier filed U.S. Provisional Patent Application Ser. No. 61/642,296 entitled "Theft Detection System for Retail Establishments," filed on May 3, 2012, the entire teachings of which are incorporated herein by this reference.

This application is related to and claims the benefit of earlier filed U.S. Provisional Patent Application Ser. No. 61/642,740 entitled "Scan Avoidance Detection System for Mobile and Fixed Self-Checkouts," filed on May 4, 2012, the entire teachings of which are incorporated herein by this reference.

BACKGROUND

Retail establishments commonly use point of sale or other transaction terminals, such as cash registers, to allow customers of those establishments to purchase items.

As an example, in a conventional department store, supermarket or other retail establishment, a customer collects items for purchase and places the items in a shopping cart, basket, or simply carries them to a point of sale terminal to purchase those items in a transaction. The point of sale terminal may be staffed with an operator such as a cashier who is a person employed by the store to assist the customer in completing the sales transaction. In some cases, retail establishments have implemented self-checkout point of sale terminals in which the customer is the operator and scans his items for purchase. In either case, the operator typically places items for purchase on a counter, conveyor belt or other item input area.

Point of sale terminals typically include a scanning device such as a laser or optical scanner system that operates to identify a Uniform Product Code (UPC) label or bar code affixed to each item that the customer desires to purchase. The laser scanner is usually a peripheral device coupled to a computer that is part of the POS terminal.

To scan an item, an operator picks up each item, one by one, from the item input area such as a conveyor and passes each item over a scanning area such as glass window built into the counter or checkout area to allow the laser scanner to detect the UPC code. After the point of sale computer identifies the UPC code of an item, the point-of-sale scanning terminal performs a lookup in a database to determine the price and identity of the scanned item. Alternatively, in every case where the operator can scan the item, the operator may likewise enter the UPC or product identification code into the terminal manually or through an automatic product identification device such as an RFID reader.

As the operator (such as an store employee or the customer) scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and, in response, the operator places the item into an item output area such as a downstream conveyor belt or other area for retrieval of the items by the customer or for bagging of the items into a shopping bag or other item carrier.

As well known, after all items in the transaction are scanned in this manner, the operator indicates to the point of sale terminal that the scanning process is complete and the point of sale terminal displays a total purchase price to the customer who then pays the store for the items purchased in that transaction.

These conventional systems that provide for purchase of items using an automated item identification systems such as a scanner suffer from a variety of deficiencies. In particular, operation of such systems can be compromised, either knowingly or unknowingly, by an operator in a manner that allows a customer to receive possession of one or more items without paying for them. For example, such scanning systems are susceptible to "pass-throughs," also know as "sweethearting" in which an operator purposefully or accidentally fails to scan an item as that item moves through the transaction area for proper scanning. In such cases, the POS system never detects the un-scanned item and the item is thus never totaled into the purchase price. Thus, the customer can receive one or more items for free. Retail chains lose millions of dollars a year due to operator error or fraudulent activity of this nature.

In a non-fraudulent example, an operator may unknowingly pass an item through the scanning area during a transaction and place the item into the item output area such as a downstream conveyor belt, but no scan of the item took place. It is possible that the operator was not paying close attention and did not notice (or did not care) that the scanner failed to beep during scanning of an item.

As an example of "sweethearting" that represents fraud on the retail establishment, an operator assists a customer who is personally known to the operator (e.g. a friend or conspirator of the operator). The scan operator intentionally passes the item over a scan window without the item being detected by the scanner. Scan avoidance can occur in self-checkout line as well.

One way to prevent proper scanning is to cover or block the UPC label as it is passes by the scanner's detection window. In such a situation, the item is included with other items that may or may not have also been scanned, and the customer or operator continues along with a transaction as if the item was properly scanned.

After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of the scanned items. After paying, the customer leaves the store with all items, having only paid for those items that were properly scanned or entered into the POS system.

In another fraudulent example known as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop conventional techniques for detecting fraudulent or accidental operator error in use of POS terminals. The conventional systems in the field of detection of pass-through and sweehearting provide for the detection of abnormally long "scan-gaps". A "scan-gap" is the amount of time between consecutive scans at the point of sale terminal. When an item is passed through a scanner region without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric for determining improper activity. Thus, conventional systems that attempt to use scan gaps as a method for detecting fraudulent activity are prone to problems.

Other conventional systems include a surveillance camera to record an in-person sales transaction on video. In such an instance, the video can be reviewed at a later time in the store to determine whether there were any scan errors associated with a particular sales transaction.

Buying items in retail establishments has traditionally taken place at a checkout counter, where an employee, the "cashier," would take inventory of the items to be purchased and record them in the point of sale computer system. Various devices could be used to facilitate this task, such as making use of a flatbed barcode scanner or handheld barcode reader.

However, retailers are increasingly offering various other methods for purchasing items. For example, many of these involve the customer taking inventory of, or transacting, items for purchase, entering them into a point of sale or other device, and then paying for the items, without the help of store personnel.

As discussed above, one such innovation in the retail sales industry is "mobile-checkout" systems. Via mobile-checkout system, the customer uses a hand-held device to take inventory of purchased items as the customer goes about selecting items from store shelves. Retail items can be scanned between a time of selecting an retail item off a shelf and placing the retail item in a respective item carrier. This is beneficial because the inventorying or transacting of items to be purchased occurs during the shopping phase, reducing the time spent checking out and paying. The handheld device can be a retailer-provided device or, increasingly commonly, through the use of a customer's smart phone or tablet.

BRIEF DESCRIPTION

The advent of systems such as mobile self-checkout has resulted in novel ways for thefts and errors to occur. For example, a customer can place an item into his or her shopping cart without first inventorying the item. Then, upon checking out and paying, the un-inventoried scan-avoided item or can be bagged and leave a retail environment with the customer, just as any other item would. Scan avoidance can occur in any situation such as self-checkout, mobile checkout, standard checkouts, etc.

Embodiments herein include novel ways for protecting items against theft and loss due to the use or misuse of different types of checkout systems (e.g., standard checkouts, self-checkout systems, mobile checkout systems, etc.).

In one embodiment, a scan avoidance detection system includes a surveillance system and a digital video analyzer unit. The surveillance system can include a camera system composed of multiple analog and/or digital cameras, stationary, PTZ, etc. The camera system provides video coverage of the shelves, stocking areas, floor, and other travel zones of a retail store, and one or more data feeds providing a record of items inventoried and purchased. In addition to video feeds from respective surveillance cameras, the scan avoidance detection system can receive various other data feeds of information such as information from weight sensors, RFID readers, contact closures, tripwires, auxiliary systems that generate specific events from a POS data feed such as "skip bagging" and "attendant override" messages, etc.

In one embodiment, the scan avoidance detection system analyzes the video feeds provided by the surveillance camera system. It can be configured to identify item carrier apparatus or devices such as shopping carts, trolleys, handheld baskets, and other item carrying devices typically used to convey items for purchase by retail stores.

Upon detection and/or tracking of the shopping cart (item carrier apparatus), the scan avoidance detection system inspects the cart and surrounding area for activity. The activity can indicate instance in which the inventory within the cart changes due to the customer either placing or removing and item from the item carrier apparatus. Such activity can be detected based upon detecting relative motion in the interior of the cart, detecting motion occurring along the boundaries of the cart, blob tracking along the boundaries of the cart extending inward (similar to the way that the cashier object interacts with the input and output belts as described in U.S. Pat. No. 7,631,808, the entire teachings of which are incorporated herein by this reference), etc. The activity can be detected based on analyzing before/after imagery of a cart and respective items, activity can also be based on object recognition and identification techniques to identify and/or count the items in the cart, and so on. Any of one or more of such methods can provide an accurate and precise count or change-in-count of the items present in the cart at any given time. Change in count is a detectable sensor event.

The item count information as generated by the monitoring system as discussed herein can be used in conjunction with the POS data feed (e.g., transaction log data information) in order to determine if an item or items have been transacted/entered into shopper's cart inventory and are slated to be purchased. If the visual count or change in the visual count does not correspond to an entry or entries in the data feed, then it is known that there are one or more items placed into the item carrier apparatus that have not been properly accounted for or scanned by the customer. Embodiments herein can include analyzing data received from one or more auxiliary sensor devices (such as sensor hardware or devices other than an item scanner device that is used to scan items). The auxiliary sensor data can be used individually or in conjunction with other transaction information such as video data including images of activity (such as placing of an item in a shopping cart, movement of an item to an or of a checkout station, etc.) and a log of transaction data (such as transaction data produced by a scanner device). Scan avoidance activity results in loss by the retailer and can be indicative of theft, error, customer distress such as frustration by the customer, etc., to scan a retail item.

Embodiments herein can be implemented at of one or more suitable locations to detect scan avoidance in a retail environment. For example, the scan avoidance detection systems as discussed herein can be implemented in checkout stations where a customer presents retail items for purchase prior to leaving the store; the scan avoidance detection system can be implemented in a mobile checkout system in which a customer uses a scanner device to tally retail items as they are placed in a respective item carrier; and so on.

In accordance with a first embodiment, computer processing hardware receives video data. The video data captures images of a customer in a shopping area placing a set of retail items into an item carrier apparatus. The computer processing hardware additionally receives a log of transaction data itemizing presence of at least a portion of the retail items handled by the customer and placed in the item carrier apparatus. The computer processing hardware detects a location of the item carrier apparatus via analysis of the received video data. The computer processing hardware detects video events via video analysis of the received video data. The video events indicate addition of a given retail item to the item carrier apparatus. Based on comparing the received log of transaction data and the video events, the computer processing hardware detects absence of a transaction record in the log for the given retail item placed in the item carrier apparatus.

The first example embodiment can be implemented along with any of one or more of the following features to produce yet further embodiments:

For example, the log of transaction data can be scanning information generated by and received from an item scanner device operated by the customer. A customer uses the item scanner device to scan each item in the portion of retail items placed into the item carrier apparatus. The customer may fail to properly scan a given retail item placed in the item carrier apparatus.

As mentioned, the computer processing hardware may detect absence of the transaction record in the log for the given retail. In one embodiment, detecting the absence of a transaction record can include: based on analyzing the images, detecting a particular video event capturing placement of the given retail item in the item carrier apparatus by the customer; producing a time value for the particular video event, the time value indicating when the given retail item was placed in the item carrier apparatus; correlating the time value to the log of transaction data; and failing to find presence of the transaction record in the log corresponding to the particular video event around the time value indicating when the given retail item was placed in the item carrier apparatus.

Visually detectable markers can be affixed to the item carrier apparatus to facilitate identification and tracking of the item carrier apparatus. The visually detectable markers are detectable by a video system producing the video data capturing the images. The visually detectable markers facilitate detection of a location of the item carrier apparatus in the images. In one embodiment, the computer processing hardware utilizes the visually detectable markers to identify the location of the item carrier apparatus in the images. By way of a non-limiting example, the visually detectable markers can be invisible.

In accordance with further embodiments, the computer processing hardware receives item information indicating a location of different retail items available in the retail environment. The computer processing hardware evaluates the log of transaction data 122-D in view of the item information to determine if the video events are suspicious or not suspicious.

In accordance with yet further embodiments, the computer processing hardware receives sensor data associated with placing of the set of retail items into the item carrier apparatus. The sensor data can be generated by sensor hardware other than an item scanner device used by the customer to produce the log of transaction data. The computer processing hardware analyzes the sensor data to detect sensor events. Based on a combined analysis of the video events and the sensor events, the computer processing hardware confirms instances in which activity or actions are suspicious or not suspicious.

In still further embodiments, the computer processing hardware produces a first output value for a detected video event. The computer processing hardware produces a second output value for a detected sensor event. The computer processing hardware produces an aggregated value based on a combination of the first output value and the second output value. Based on comparison of the aggregated value to a threshold value, the computer processing hardware produces an overall output value indicative of whether a customer action corresponding to the detected video event and the detected sensor event is suspicious. In response to detecting the absence of the transaction record in the log for the given retail item placed in the item carrier apparatus, the computer processing hardware or other suitable resource sends an alert to a receiving device.

Yet further embodiments herein include computer processing hardware that produces a first probability value indicating a degree to which a detected video event as captured by the video data is suspicious in view of monitoring a first attribute of a customer action in the shopping area. The customer action can be or include placement of the given retail item in the item carrier apparatus without the given retail item being scanned by the customer. The computer processing hardware produces a second probability value indicating a degree to which a detected sensor event as captured by the sensor data is suspicious in view of monitoring a second attribute of the customer action in the shopping area. The computer processing hardware then combines the first probability value and the second probability value under a probabilistic framework to produce an output value. The output value indicates a degree to which the customer action is suspicious or not suspicious.

In accordance with a second embodiment, computer processing hardware: receives video data, the video data capturing images of a checkout transaction in which an operator passes retail items from an input region to an output region of a checkout station disposed in a retail environment, an item scanner device operated to detect items passing between the input region and the output region; receives a log of transaction data generated by the item scanner device, the log of transaction data itemizing at least a portion of the retail items passing from the input region to the output region; receives sensor data associated with processing of the retail items, the sensor data generated from sensor hardware other than the item scanner device; analyzes the video data to identify video events such as events indicative of item presence, handling of items by an operator, etc.; analyzes the sensor data to identify sensor events indicative of item presence; and based on a combined analysis of the sensor events and video events, determines which of the multiple retail items passing to the output region were not properly detected by the item scanner device for purchase.

The second example embodiment can be implemented along with any of one or more of the following features to produce yet further embodiments:

For example, in one embodiment, the sensor data is weight sensor data, the weight sensor data indicating a weight of items placed in the output region of the checkout station.

The sensor data can be or include RFID (Radio Frequency Identifier) tag data indicating identities of items placed in the output region of the checkout station.

The sensor data can be or include EAS (Electronic Article Surveillance) tag deactivator data indicating identities of items placed in the output region of the checkout station.

In one embodiment, the checkout station is a self-checkout station in which the customer is trusted at the checkout station to properly scan the retail items via the item scanner device for purchase.

In accordance with yet further embodiments, the computer processing hardware: produces a first output value for a detected video event based on analysis of the video data; produces a second output value for a detected sensor event based on analysis of the sensor data, the detected sensor event and the detected video event occurring based on a particular customer action; produces an aggregated value based on a combination of the first output value and the second output value; and uses the aggregated value as a basis to determine whether the customer action is suspicious.

In yet further embodiments, use of the aggregated value to determine that the customer action is suspicious can include: comparing the aggregated value to a threshold value; and in response to detecting that the aggregated value is greater than the threshold value, producing an overall output value indicating that the customer action is suspicious.

In accordance with still further example embodiments, the computer processing hardware produces the first output value based on a comparison of the video data and the log of transaction data, a magnitude of the first output value indicating that the detected video event is suspicious; produces the second output value based on a comparison of the sensor event data and the log of transaction data, a magnitude of the second output value indicating that the detected sensor event is not suspicious; and in response to detecting that the aggregated value is below the threshold, produces an overall output value indicating that the customer action is not suspicious.

By further way of a non-limiting example, the computer processing hardware can be configured to: produce the first output value based on a comparison of the video data and the log of transaction data, a magnitude of the first output value indicating that the detected video event is not suspicious; produce the second output value based on a comparison of the sensor event data and the log of transaction data, a magnitude of the second output value indicating that the detected sensor event is suspicious; and based on the aggregate value being below the threshold, produce an overall output value indicating that the custom action is not suspicious.

In yet further non-limiting example embodiments, the computer processing hardware: produces a first probability value indicating a degree to which a detected video event as captured by the video data is suspicious in view of monitoring a first attribute of a customer action; produces a second probability value indicating a degree to which a detected sensor event as captured by the sensor data is suspicious in view of monitoring a second attribute of the customer action; and combines the first probability value and the second probability value under a probabilistic framework to produce an output value, the output value indicating a degree to which the customer action is suspicious.

These and other embodiments will be discussed in more detail below.

Note that any of the resources as discussed herein can include one or more computerized devices, computer systems, base stations, wireless communication equipment, communication management systems, workstations, handheld or laptop computers, etc., to carry out and/or support any or all of the method operations disclosed herein. In other words, processor hardware such as one or more computerized devices can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor or logic, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable hardware storage medium having instructions stored thereon. The instructions, when executed by processor hardware (one or more processor devices), cause the processor hardware to: receive video data, the video data capturing images of a customer in a shopping area placing a set of retail items into an item carrier apparatus; receive a log of transaction data itemizing presence of at least a portion of the retail items handled by the customer and placed in the item carrier apparatus; detect a location of the item carrier apparatus via analysis of the received video data; detect video events via video analysis of the received video data, the video events indicating addition of a given retail item to the item carrier apparatus; and based on comparing the received log of transaction data and the video events, detect absence of a transaction record in the log for the given retail item placed in the item carrier apparatus.

Another embodiment includes a computer readable hardware storage medium having instructions stored thereon. The instructions, when executed by a processor (such as a hardware processor resource), cause the processor hardware to: receive video data, the video data capturing images of a checkout transaction in which an operator passes retail items from an input region to an output region of a checkout station disposed in a retail environment, an item scanner device operated to detect items passing between the input region and the output region; receive a log of transaction data generated by the item scanner device, the log of transaction data itemizing at least a portion of the retail items passing from the input region to the output region; receive sensor data associated with processing of the retail items, the sensor data generated from sensor hardware other than the item scanner device; analyze the video data to identify video events of the operator handling the retail items; analyze the sensor data to identify sensor events indicative of item presence; and based on a combined analysis of the sensor events and video events, determining which of the multiple retail items passing to the output region were or were not properly detected by the item scanner device for purchase.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, logic, or as hardware alone such as within a processor, or within an operating system, or within a software application, etc.

As discussed herein, techniques herein are well suited for use in retail environments. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional summary and details and/or possible perspectives (permutations) of the invention(s), the reader is directed to the Detailed Description section and corresponding figures of the present disclosure as further discussed below.

Figure 1:
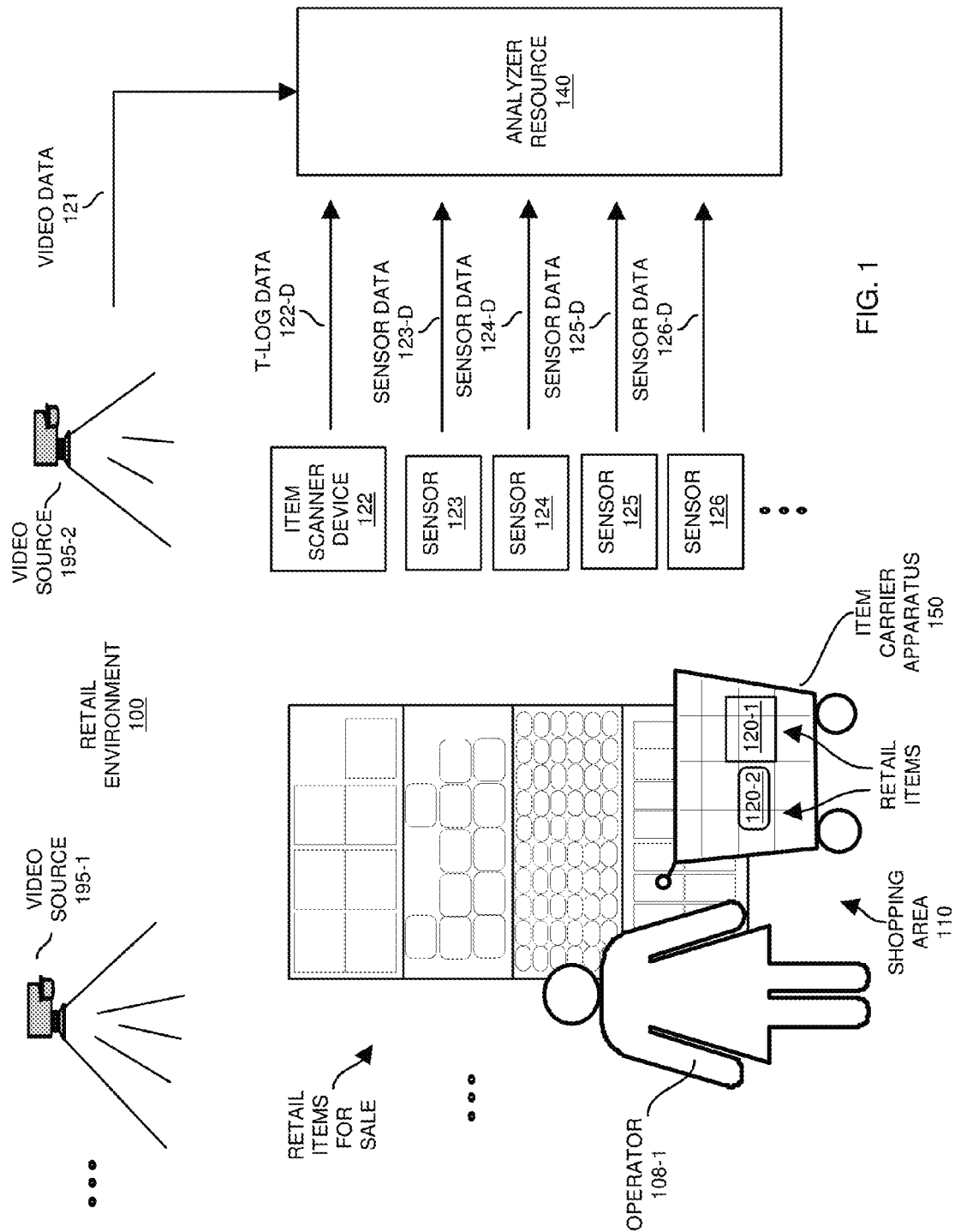
FIG. 1 is an example diagram of a retail environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with embodiments herein, a scan avoidance monitoring system detects instances in which a respective customer in a retail environment fails to properly scan or tally one or more retail items for purchase. To avoid generating false positives, such as flagging of events as item scan avoidances when they really are not, the scan avoidance system can be configured to require a level of confirmation by one or more other analyzers to flag a particular circumstance as a scan avoidance event. If an event is confirmed as being suspicious, the overall action can be marked as suspicious.

More specifically, FIG. 1 is an example diagram of a retail environment including an analyzer resource according to embodiments herein.

As shown, retail environment 100 includes video source 195 (e.g., video source 195-1, video source 195-2, and so on) configured to monitor one or more events in retail environment 100 such as management of retail items 120 (e.g., retail item 120-1, retail item 120-2, etc.) in item carrier apparatus 150. Management of retail items can include placing items in the item carrier apparatus 150, removing retail items from item carrier apparatus 150, moving retail items from one location to another in item carrier apparatus 150, handling retail items, etc.

Video sources 195 can be placed at any suitable locations in the retail environment 100 to monitor one or more customers. For example, in one embodiment, the retail environment 100 includes multiple video sources 195 disposed in the ceiling of a retail building to obtain a top view of a user's actions and a respective item carrier apparatus as they move about the retail environment 100. Each video monitoring system (such as video source or image capturing device) can monitor a different region of the retail environment 100. For example, video source 195-1 can be configured to monitor a first region of the retail environment 100, video source 195-2 can be configured to monitor a second region of the retail environment 100, and so on.

Note that one or more video source can be mounted on the item carrier apparatus 150. In such an instance, there is no need to identify a corresponding item carrier apparatus from different image streams feeds as the video source in the item carrier apparatus 150 would monitor the same item carrier apparatus as it moves around the retail environment 100.

In accordance with yet further embodiments, note that the item scanner device 122 can be configured to include a camera to obtain video images of items scanned as well as images of the items in the item carrier apparatus 150. For example, the item scanner device can be fixedly mounted to the item carrier apparatus to scan retail items as well as monitor images of the item carrier apparatus. Item scanner device 122 can be a mobile handheld device operated by the 108-1. The item scanner device 122 can be placed in a holder or holster affixed to the item carrier apparatus 150. While in the holder, the item scanner device can be used to scan retail items. A video camera in the item scanner device can be configured to produce images of retail items present in the item carrier apparatus 150 or produce images of the items being placed in the item carrier apparatus 150, produce images of the operators movements, actions, etc.

Video analysis of multiple video feeds can be used to track movement of the operator 108-1 from one monitored region to the next as the operator 108-1 moves about the retail environment 100.

Video sources 195 can be disposed to monitor the operator's actions from any vantage point. For example, as mentioned, one or more video sources 195 can be disposed in the ceiling of the retail environment 100. Note that video sources 195 mobile and can be disposed in any suitable location such as within or on the item carrier apparatus 150, video sources can be mounted to shelves on which retail items are made available for selection by the customers, etc.

Item carrier apparatus 150 can be any suitable type of device, apparatus, etc., in which the operator 108-1 (such as a customer, store employee cashier, etc.) selects items for sale and places such retail items 120 in the item carrier apparatus 150 for purchase.

By further way of a non-limiting example, the operator 108-1 uses item scanner device 122 to scan retail items 120 prior to placement in the item carrier apparatus 150. Each of the retail items 120 can include a unique identifier value such as a bar code, RFID tag, etc. Item scanner device 122 produces log of transaction data 122-D indicating each of the retail items that has been scanned for purchase by the operator. In one embodiment, note that the log of transaction data 122-D is a stream of real-time or substantially real-time data produced by the item scanner device 122. Analyzer resource 140 can be configured to analyze the different types of events at or around a time that the events occur.

In one embodiment, it is desirable that the log of transaction data 122-D accurately reflects all of the retail items that have been placed in the item carrier apparatus 150 as the log of transaction data 122-D can be used as a basis to checkout a respective operator 108-1 from the retail environment 100. For example, via log of transaction data 122-D, a respective retail checkout system can generate an amount due for payment by the operator 108-1 for purchase of the retail items 120 in the item carrier apparatus 150.

In addition to including one or more video sources 195, the retail environment 100 can include zero or more additional hardware sensors such as sensor 123, sensor 124, sensor 125, sensor 126, and so on.

Each of the sensors can be a respective device configured to monitor a different attribute of the retail transaction such as the operator 108-1 selecting items for purchase and placing them in the item carrier apparatus 150.

For example, sensor 123 can be a weight sensor configured to monitor a weight of the retail items 120 placed in the item carrier apparatus 150. Sensor 123 produces sensor data 123-D. In one embodiment, the sensor data 123-D keeps track of a total weight of the retail items 120 in the item carrier apparatus 150. Changes in the detected weight indicate when a retail item is placed in the item carrier apparatus 150.

The detected weight should correspond to the log of transaction data. For example, if two items weighing 20 pounds each are scanned for purchase and placed in the item carrier apparatus 150, the sensor data 123-D should indicate a weight of 40 pounds in the cart. If another item weighing 5 pounds is properly scanned and then placed in the item carrier apparatus 150, the sensor data 123-D should indicate a current weight of 45 pounds. Thus, the weight of the in the item carrier apparatus 150 can be used as a basis to determine if an item is properly scanned before being placed in the item carrier apparatus 150. That is, if the weight of the retail items in the item carrier apparatus 150 increases by 10 pounds and the is no corresponding scan of one or more items, then this sensor event may be considered suspicious.

By further way of a non-limiting example, sensor 124 can be a RFID tag reader configured to sense a presence of RFID tagged retail items placed in or detected in a vicinity of the item carrier apparatus 150. Sensor 124 produces sensor data 124-D. In one embodiment, the sensor data 124-D indicates the identities of one or more corresponding detected retail items 120.

By further way of a non-limiting example, sensor 125 can be an EAS (Electronic Article Surveillance) tag deactivator device that removes and/or deactivates tags attached to one or more of the retail items. Sensor 125 produces sensor data 125-D. In one embodiment, the sensor data 125-D indicates identities of one or more of the retail items 120 as sensed by the sensor 125.

By way of further non-limiting example, sensor 126 can be a non-visual motion detector device configured to detect physical motion of the operator 108-1 placing retail items in or removing retail items from the item carrier apparatus 150. For example, the sensor 126 can be mounted on the item carrier apparatus 150 to detect circumstances in which the operator 108-1 moves their arm in a vicinity of a certain region of the item carrier apparatus 150. Sensor 126 produces sensor data 126-D. In one embodiment, the sensor data 126-D indicates movement by the operator 108-1.

In one embodiment, the sensors (including video sources 195, which are a type of sensor) monitor a mobile checkout in which the customer is trusted to properly scan the retail items 120 via the item scanner device 122 for purchase.

Retail environment 100 includes analyzer resource 140. Analyzer resource 140 can include or be executed by respective computer processing hardware (such as one or more computer devices).

As shown, the analyzer resource 140 receives the video data 121. As mentioned, the video data 121 can capture images of a customer (such as operator 108-1) in a shopping area 110 placing a set of retail items 120 into item carrier apparatus 150. The video sources 195 also can capture images of a respective customer or person merely taking possession (e.g., carrying) one or more retail items.

By way of a non-limiting example, the analyzer resource 1430 can be configured to analyze received data (e.g., log of transaction data 122-D, sensor data 123-D, sensor data 123-4, etc.) in real-time or approximately in real-time. Such an embodiment is useful in order to detect suspicious activity nearer in time when the suspicious activity actually occurs and is detected by one or more different sensor hardware.

The analyzer resource 140 receives a log of transaction data 122-D itemizing presence of at least a portion of the retail items 120 handled by the operator 108-1 and placed in the item carrier apparatus 150. The analyzer resource 140 detects a location of the item carrier apparatus 150 in the retail environment 100 via analysis of the received video data 121. The analyzer resource 140 detects video events via video analysis of the received video data 121.

In this example embodiment, the video events in the analyzed images of video data 121 indicate addition of a given retail item to the item carrier apparatus 150. Based on comparing the received log of transaction data 122-D and the video events detected in video data 121, the analyzer resource 140 detects absence of one or more transaction records in the log for respective one or more retail items placed in the item carrier apparatus 150.

As a more specific example, assume that at a first point in time, the operator 108-1 places retail item 120-1 in the item carrier apparatus 150. Prior to placement of the retail item 120-1 in the item carrier apparatus 150, the operator 108-1 scans the retail item 120-1 using item scanner device 122. In such an instance, via analysis of the video data 121, the analyzer resource 140 detects that the retail item 120-1 is placed in the item carrier apparatus 150. The analyzer resource 140 analyzes the log of transaction data 122-D and detects that the item scanner device 122 properly scanned a unique identifier value such as a respective bar code of the retail item 120-1. Since a transaction record (such as scan of an item) exists in the log of transaction data 122-D for the retail item 120-1, the placement of the retail item 120-1 into the item carrier apparatus 150 is not flagged as suspicious activity.

At a second point in time, assume that the operator 108-1 places retail item 120-2 in the item carrier apparatus 150 without properly scanning the retail item 120-2 using item scanner device 122. In such an instance, via analysis of the video data 121, the analyzer resource 140 detects that the retail item 120-2 is placed in the item carrier apparatus 150. The analyzer resource 140 analyzes the log of transaction data 122-D to identify whether the item scanner device 122 properly scanned a unique identifier value such as a respective bar code of the retail item 120-2. Assume that the operator 108-1 did not scan the retail item 120-2 using the item scanner device 122 such that no record exists in the log of transaction data 122-D for the retail item 120-2. Since no record exists in the log of transaction data 122-D for the retail item 120-2 placed in the item carrier apparatus 150, the activity or transaction event is marked as potentially suspicious activity.

In accordance with additional embodiments as discussed herein, any of the additional sensor data produced by the potentially suspicious activity can be further analyzed to confirm whether or not the non-scanning of retail item 120-2 via analysis of additional sensor data.

Note that while the item scanner device itself can be construed as generating sensor data, in one embodiment, such "authoritative" sources can be excluded from consideration. This is due to the fact that the POS (Point of Sale) itself treats such data sources as the ground truth data by which it registers items for purchase. Such sources may not indicate the presence of items for purchase but that were not, in fact, purchased. By contrast, the sensors so described in this document may not be authoritative sources of items for entry into the POS, and their data can indeed be used to infer item presence, even for those items present but not scanned.

Figure 2:
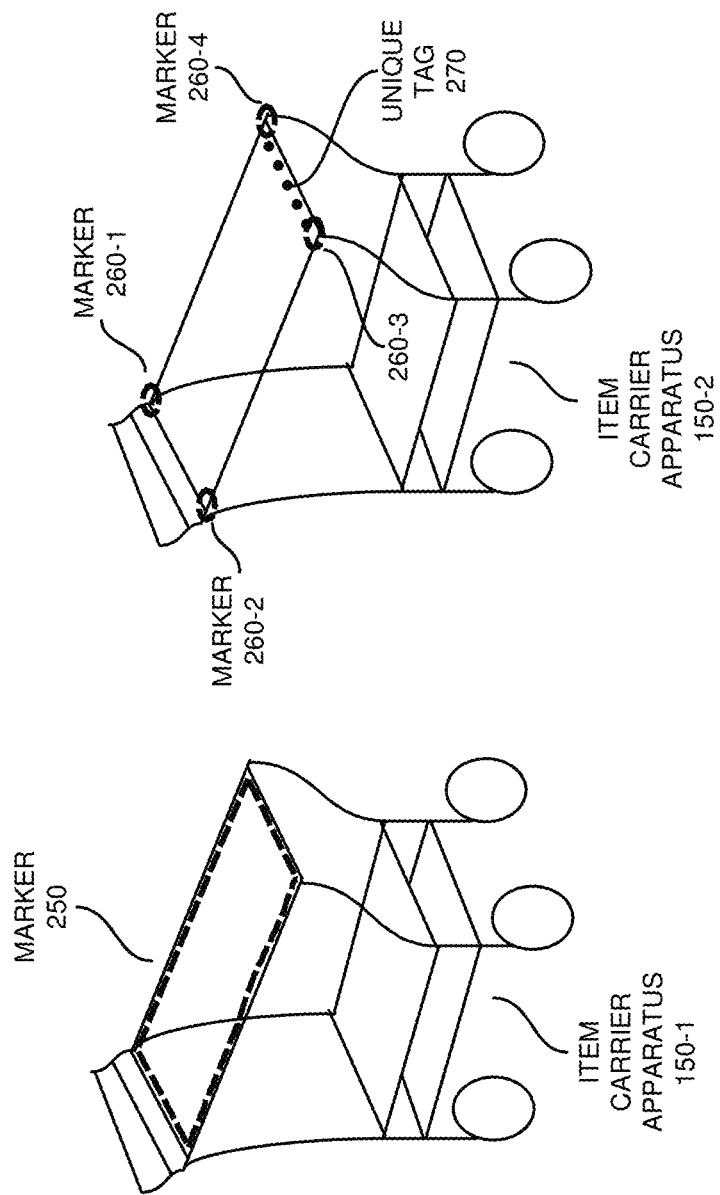
FIG. 2 is an example diagram of providing one or more markers or visual indicators on an item carrier apparatus according to embodiments herein.

FIG. 2 is an example diagram illustrating techniques facilitating detection of an item carrier apparatus according to embodiments herein.

As shown, there are a number of ways to enhance detection of an item carrier apparatus 150 via computer vision-based techniques. For example, as shown, a topside perimeter of an opening of a respective item carrier apparatus 150-1 can be marked using marker 250 to indicate a region of interest.

As another example, a set of one or more markers 260 can be disposed at locations shown on item carrier apparatus 150-2 to indicate the region of interest associated with the item carrier apparatus 150-2. For example, visual marker 260-1 can be affixed to a first corner of the item carrier apparatus 150-2 as shown; visual marker 260-2 can be affixed to a second corner of the item carrier apparatus 150-2 as shown; visual marker 260-3 can be affixed to a third corner of the item carrier apparatus 150-2 as shown; visual marker 260-4 can be affixed to a second corner of the item carrier apparatus 150-2 as shown.

The various markings applied to the perimeter, corners, etc., of the item carrier apparatus 150-1 facilitate the task of automatic detection and localization of the cart by a computer vision process. The visual markers (such as marker 250, visual markers 260, etc.) can include one or more of distinctive colors; the visual markers can be created via application of reflective material to the item carrier apparatus; the visual markers can include a reflective or fluorescent material that radiates in the infrared spectrum; the visual markers can include active lighting such as with LEDs Light Emitting Diodes); the visual markers can include active lighting with less conspicuous IR (Infrared) LEDs.

Note that the material used to mark the item carrier apparatus at different locations on the item carrier apparatus can vary. For example, the visual marker 260-1 can be unique with respect to the other visual markers 260-2, 260-3, and 260-4. The visual marker 260-2 can be unique with respect to the other visual markers 260-1, 260-3, and 260-4. The visual marker 260-3 can be a unique with respect to the other visual markers 260-1, 260-2, and 260-4. The visual marker 260-4 can be a unique with respect to the other visual markers 260-1, 260-2, and 260-3. Each of the visual markers can be detected via video analysis. Because the visual markers are unique with respect to each other, it is possible to determine an orientation of the item carrier apparatus in the retail environment 100. That is, an orientation of video sources is known. The unique marker material disposed on the item carrier apparatus enables an analyzer to identify an orientation of the item carrier apparatus.

As further shown in FIG. 2, the visual markings can also be used to identify a specific cart or class of carts to which the item carrier belongs. In this example, a unique tag 270 such as a barcode is affixed to the front of the item carrier apparatus 150-2 in a manner that makes it suitable to be automatically detected by a video analysis system monitoring video data 121. The user can use the item scanner device 122 or other suitable resource to register use of the item carrier apparatus 150 to the operator 108-1. As an example, the operator 108-1 can scan a personal card to input personal information into the item scanner device 122. The user also can scan the unique tag 270 to register use of the item carrier apparatus 150-2 to the operator 108-1. When moving about the retail environment 100, the images produced by the video sources 195 can be analyzed to track the item carrier apparatus 150-2 as well as to identify which customer is using the item carrier apparatus 150-2.

Visual Markings

As mentioned, visual markings can be affixed to each item carrier apparatus to enhance the ability of a vision system such as video source 195 to detect the cart. Such markings can include affixing one or more labels to the top of the cart facing the surveillance camera systems. For instance, these markings can be in a bright, distinctive color to aid in the detection process, the markings can be reflective material, etc.

Such markings could be placed along the perimeter of the cart or at other advantageous locations along the cart visible to the cameras. Furthermore, such markings could be placed at one or more corners of the cart or following some other pattern of placement. The markings can also encompass the part of or the entire cart, such as having a cart or part of a cart be a distinctive color. Regardless, it should be clear that this is not the full enumeration of possible ways in which visually distinctive markings can be applied in order to facilitate the task of automatically detecting and localizing the cart. These markings such as unique tag 270 could also include machine-readable print, such as a barcode or QR code, or human readable print, such as alphanumeric characters, in order to further identify the cart and possibly uniquely identify the cart.

Invisible Markings

The previous section introduced the idea of incorporating visual markings on the cart in order to facilitate the visual detection process. Limitations of such a system are that they may be obtrusive to the customer. They may also disrupt a retailer's brand and labeling. They may also signal to the customer that the cart is being tracked, which may or may not be a desirable response. Furthermore, a vandal may be prone to disrupt the markings if he or she sees them.

Invisible markings may help in many of these cases. Invisible markings could include material reflective in the infrared (IR) bands or other bands that are detectable by surveillance camera systems but not by the naked eye of operator 108-1. It should be understood that the possible locations of such invisible markings follow those outlined in the "Visible Markings" section described previously and that any and all such locations are possible in this case as well.

Active Lighting

More active solutions can also be incorporated to aid in the cart detection and localization process. For instance, LEDs can be placed along the cart in order to provide an active signal that can be detected by a visual recognition process. The LEDs can either be in the visible spectrum or else in the less conspicuous IR spectrum.

Furthermore, the power for such a solution can either come from an on-board battery or provided via solar cells. In one embodiment, solar cells harness the energy of the overhead lights and of sunlight in order to power the LEDs. The solar configuration can also be combined with an on-board battery to store solar power. Furthermore, energy saving plans can be applied in which the LEDs are turned off when the cart is not in use, thereby allowing the solar cells to most efficiently recharge any on-board battery pack. The LEDs can also be powered by generating power from the cart as the customer pushes it. As always, this should not be construed as an exhaustive list of available methods to power the LEDs on a cart.

It should be understood that the possible locations of such active markings follow those outlined in the "Visible Markings" section described previously and that any and all such locations are possible in this case as well.

Accordingly, visually detectable markers can be affixed to a respective item carrier apparatus. The visually detectable markers are detectable by a video system such as video sources 195 producing the video data 121 capturing images of the operator 108-1 placing retail items 120 in the item carrier apparatus 150. The visually detectable markers facilitate detection of a location of the item carrier apparatus 150 in the images produced by video source 195. By way of a non-limiting example, the analyzer resource 140 utilizes the visually detectable markers to identify the location of the item carrier apparatus in the images.

As mentioned, in one embodiment, the visually detectable markers are invisible to the customer. In other words, as mentioned, the markers can be undetectable by a naked eye of the operator 108-1 managing (e.g., placing items in or removing items from) the item carrier apparatus 150.

Figure 3:
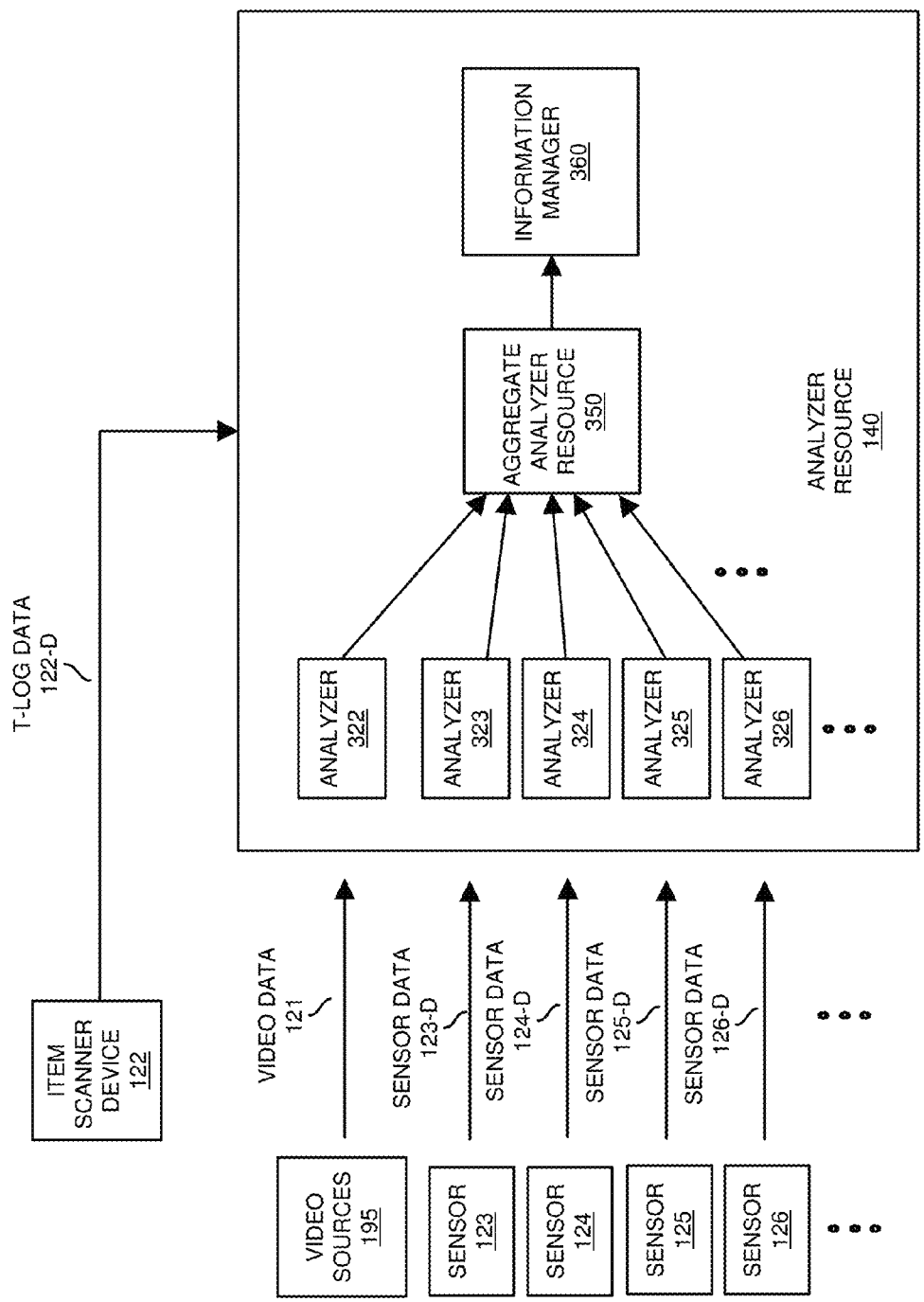
FIG. 3 is an example diagram of an analyzer resource configured to monitor and detect suspicious activity according to embodiments herein.

FIG. 3 is an example diagram illustrating analysis of received data according to embodiments herein.

As previously discussed, analyzer resource 140 receives one or more different types of sensor data to detect occurrence of possible suspicious events. As shown by way of a non-limiting example, the analyzer resource 140 can be configured to include one or more analyzers (e.g., analyzer 322, analyzer 323, analyzer 324, etc.) to analyze one or more sets of respective sensor data in view of log of transaction data 122-D.

Each analyzer (e.g., analyzer 322, analyzer 323, etc.) can be configured to analyze one or more of different type of received sensor data produced by different sensor hardware (e.g., video sources 195, sensor 123, sensor 124, sensor 125, sensor 126, etc.). In one embodiment, the sensor data (such as sensor data 123-D, sensor data 124-D, sensor data 125-D, sensor data 126-D, etc.) is generated by sensor hardware other than item scanner device 122 used by the customer to produce the log of transaction data 122-D.

As a more specific example, in one non-limiting example embodiment, assume that analyzer resource 140 is configured to include analyzer 322 to analyze video data 121 in view of log of transaction data 122-D; analyzer resource 140 includes analyzer 323 to analyze sensor data 123-D in view of log of transaction data 122-D; analyzer resource 140 includes analyzer 324 to analyze sensor data 124-D in view of log of transaction data 122-D; analyzer resource 140 includes analyzer 325 to analyze sensor data 125-D in view of log of transaction data 122-D; analyzer resource 140 includes analyzer 326 to analyze sensor data 126-D in view of log of transaction data 122-D; and so on. As mentioned, analyzer resource 140 can include any one or more analyzers to monitor respective events.

The output or outputs of each analyzer in analyzer resource 140 can include an indication of which of multiple different types of detected events is potentially suspicious. Multiple suspicious events can occur at the same time within a given set of sensor data. For example, the analyzer 322 can analyze video data 121 and detect multiple suspicious events that occur within a time window. More specifically, via analysis of the video data 121, the analyzer 322 can detect that the operator 108-1 moves his or her arm in a vicinity of the item carrier apparatus 150 without a transaction log being generated in log of transaction data 122-D. This may be a suspicious event, but in itself not enough to generate an alert that the customer fails to scan an item placed in the item carrier apparatus 150. However, via analysis of the video data 121, the analyzer 322 may detect that the item carrier apparatus 150 includes an additional retail item after the time of the detected movement of the arm. In such an instance, if there is no corresponding transaction in the log of transaction data, the analyzer 322 outputs an indication of both of the suspicious events to aggregate analyzer resource 350.

Analyzer 323 can be configured to monitor one or more aspects of sensor data 123-D. Assume that sensor data 123-D is weight sensor data representing the total weight of the retail items 120 in the item carrier apparatus 150. The sensor 123 can be disposed in the item carrier apparatus 150. An appropriate communication link (e.g., wired link, wireless link, etc.) conveys generated sensor data 123-D from the sensor 123 to the analyzer resource 140.

In response to detecting a suspicious sensor event such as an overall increase in a weight of the retail items placed in the item carrier apparatus 150 without a corresponding transaction record indicating scanning of the respective retail item in the log of transaction data 122-D, the analyzer 323 marks this sensor event as potentially a potentially suspicious sensor event. In such an instance, if there is no corresponding transaction in the log of transaction data, the analyzer 323 outputs occurrence of the suspicious events to aggregate analyzer resource 350.

In a similar manner, if present, each of the analyzers (e.g., analyzer 324, analyzer 325, and analyzer 326, . . . ) produces an output of potentially suspicious events to aggregate analyzer resource 350.

In one embodiment, aggregate analyzer resource 350 receives the output(s) produced by each of analyzers 322, 323, etc. Based on such information, the aggregate analyzer resource 350 determines whether to flag events as being suspicious to the information manager 360. In certain instances, to prevent false positives in which events are flagged as suspicious even though they likely are not, embodiments herein can require detection of multiple occurrences of suspicious activity or events for the aggregate analyzer resource 350 to flag an overall event as a suspicious activity (such as failure to properly scan an item that was placed in the item carrier apparatus 150). In other words, the aggregate analyzer resource 350 can consider aggregate of input from each of the analyzers and make a decision about whether monitored activity or a monitored action of the operator 108-1 should be considered suspicious enough to generate an alert message.

In one embodiment, in response to detecting the suspicious event due to the absence of the transaction record in the log for a given retail item placed in the item carrier apparatus 150, the information manager 360 or other suitable resource sends an alert to a receiving device. For example, the receiving device can be operated by a store employee who learns of the suspicious activity via a notification message from the information manager 360. The employee may decide to investigate the event to determine whether the operator 108-1 inadvertently or purposefully adds one or more retail items to the item carrier apparatus 150 without properly being scanned first y item scanner device 122.

Figure 4:
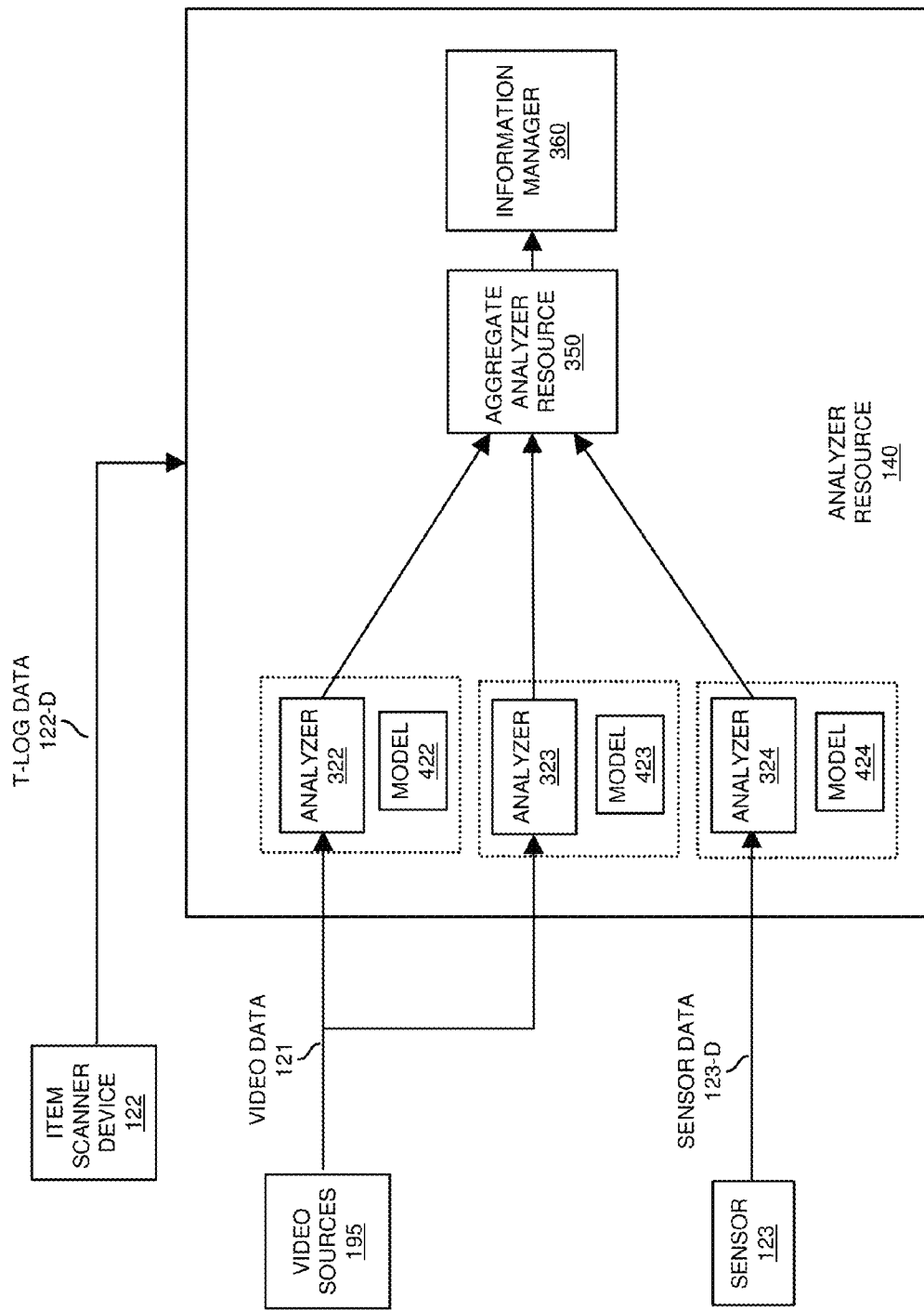
FIG. 4 is an example diagram of an analyzer resource configured to detect suspicious activity according to embodiments herein.

FIG. 4 is a diagram illustrating another example of an analyzer resource and flagging of suspicious events according to embodiments herein.

As shown and previously discussed, the analyzer resource 140 can be configured to include analyzer 322 and analyzer 323. Assume in this example that the analyzer 322 monitors the images associated with video data 121 to detect a first type of potentially suspicious activity such as motions indicative of the operator 108-1 placing a retail item in the item carrier apparatus 150. Assume in this example that the analyzer 323 monitors the images associated with video data 121 to detect a second type of potentially suspicious event such as detection of a presence of one or more additional retail items in the item carrier apparatus 150 than in a previous image frame of video data 121. In one embodiment, the video data 121 captures multiple frames of images per second. The information in the frames can be compared over time to detect a change in the number of retail items placed in the item carrier apparatus 150.

In one embodiment, the analyzer 322 analyzes the detected video events in view of probability model such as model 422. Model 422 can include probability information indicating a likelihood of whether a respective type of event as detected by analyzer 322 is potentially suspicious or not. In such an instance, the analyzer 322 generates an output value (indicative of the probability) to aggregate analyzer resource 350 indicating a degree of suspiciousness for the detected event. As mentioned, a detected event (such as motion of the operator's arm near the cart) may not be suspicious if there is an appropriate transaction record in the log of transaction data 122-D if the corresponding item has been tallied for purchase via the item scanner device 122.

In a similar manner, the analyzer 323 analyzes detected video events in view of model 423. Model 423 can include probability information indicating a likelihood of whether a respective type of event as detected by analyzer 323 is potentially suspicious or not. In such an instance, the analyzer 323 generates an output value to aggregate analyzer resource 350 indicating a degree of suspiciousness for the detected video event. As mentioned, a detected event may not be suspicious if there is an appropriate transaction record in the log of transaction data 122-D if the corresponding item has been tallied for purchase via the item scanner device 122.

In a similar manner, the analyzer 324 analyzes the detected events (such as changes in weight of items in item carrier apparatus 150) in view of model 424. Model 424 can include probability information indicating a likelihood of whether a respective type of event as detected by analyzer 324 is potentially suspicious or not. In such an instance, the analyzer 324 generates an output value to aggregate analyzer resource 350 indicating a degree of suspiciousness for the detected event. As mentioned, a detected event may not be suspicious if there is an appropriate transaction record in the log of transaction data 122-D indicating that the corresponding item has been tallied for purchase via the item scanner device 122.

Assuming that analyzer 322 and analyzer 323 detect video events and analyzer 324 detects sensor events. Based on a combined analysis of detected video events and detected sensor events, the aggregate analyzer resource 350 confirms whether respective activity or events are suspicious or not.

As a more specific example, as mentioned, the analyzer 323 can be configured to produce a first output value (such as a probability value) for a detected video event associated with video data 121. Analyzer 324 produces a second output value (e.g., probability value) for a detected sensor event associated with sensor data 123-D. The aggregate analyzer resource 350 produces an aggregated value based on a combination of the first output value and the second output value. Based on comparison of the aggregated value to a threshold value (such as a probability threshold value), the aggregate analyzer resource 350 produces an overall output value indicative of whether a customer action corresponding to the detected video event and the detected sensor event is suspicious. The aggregate analyzer resource notifies information manager 360 of such information.

In the event that too many alerts are false positives, the probability threshold value can be adjusted to a higher value to reduce generation of alerts when there is a low likelihood of scan avoidance activity. Conversely, the probability threshold value can be adjusted to a lower value to increase generation of alerts when there is a higher likelihood of scan avoidance activity.

Note that the one or more values outputted by the analyzers can be probability values based on respective models. For example, based on analyzing video data 121, the analyzer 323 can produce a first probability value indicating a degree to which a detected video event as captured by the video data 121 is suspicious in view of monitoring a first attribute (e.g., motion of the operator 108-1 with respect to the item carrier apparatus 150) while in the shopping area 110. As mentioned, the customer action can be placement of the given retail item in the item carrier apparatus without the given retail item being scanned by the customer. The analyzer 324 can produce a second probability value indicating a degree to which a detected sensor event as captured by the sensor data 123-D is suspicious in view of monitoring a second attribute (e.g., a change in the weight of retail items in the item carrier apparatus 150) of the customer action in the shopping area 110. As mentioned, and by way of a non-limiting example, the aggregate analyzer resource 140 can be configured to combine the first probability value and the second probability value under a probabilistic framework to produce an overall output value indicating a degree to which the customer action occurring within a given monitored time range is suspicious.

Figure 5:
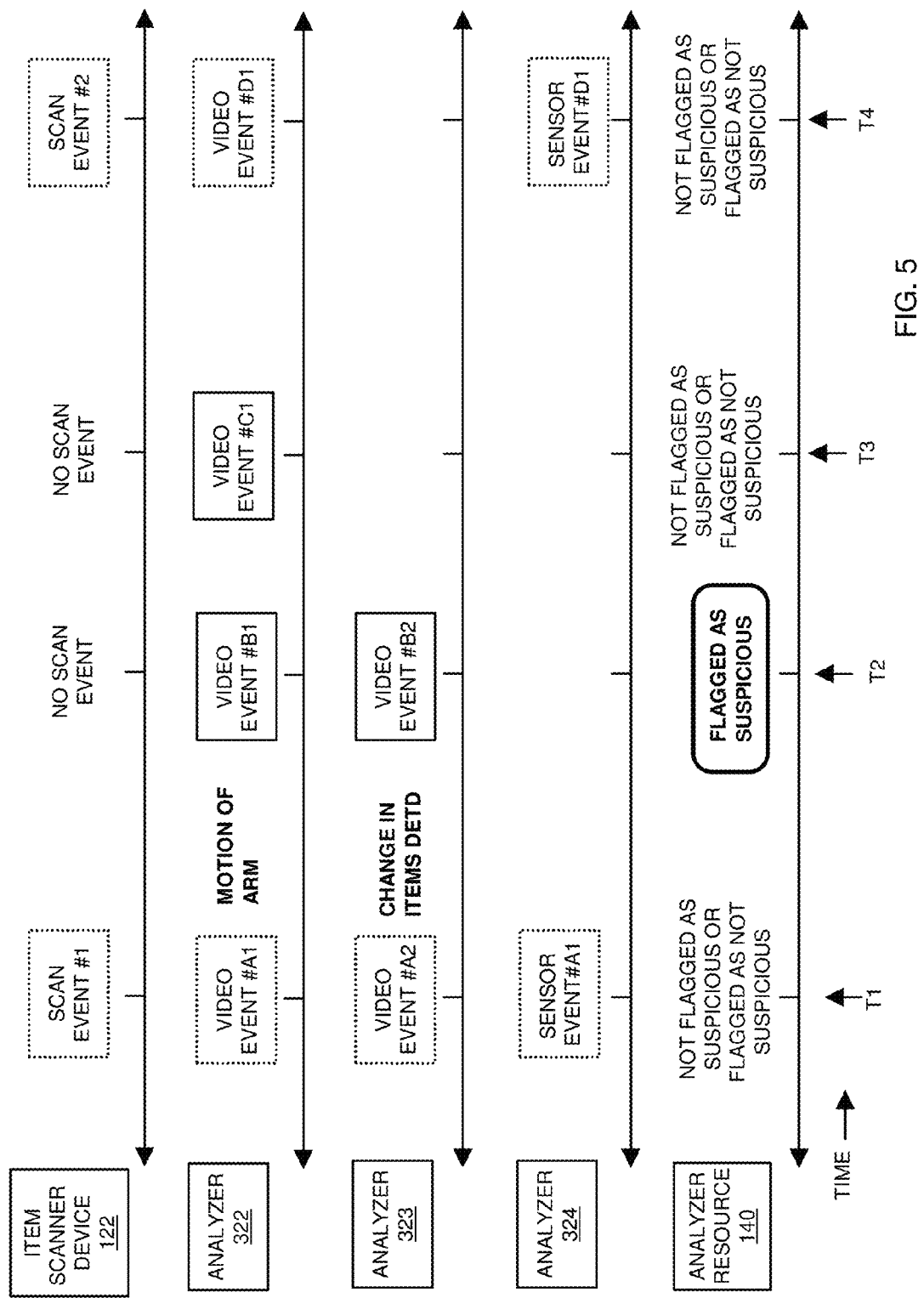
FIGS. 5 and 6 are example timing diagrams illustrating analysis of events and flagging of suspicious activity according to embodiments herein.
Figure 6:
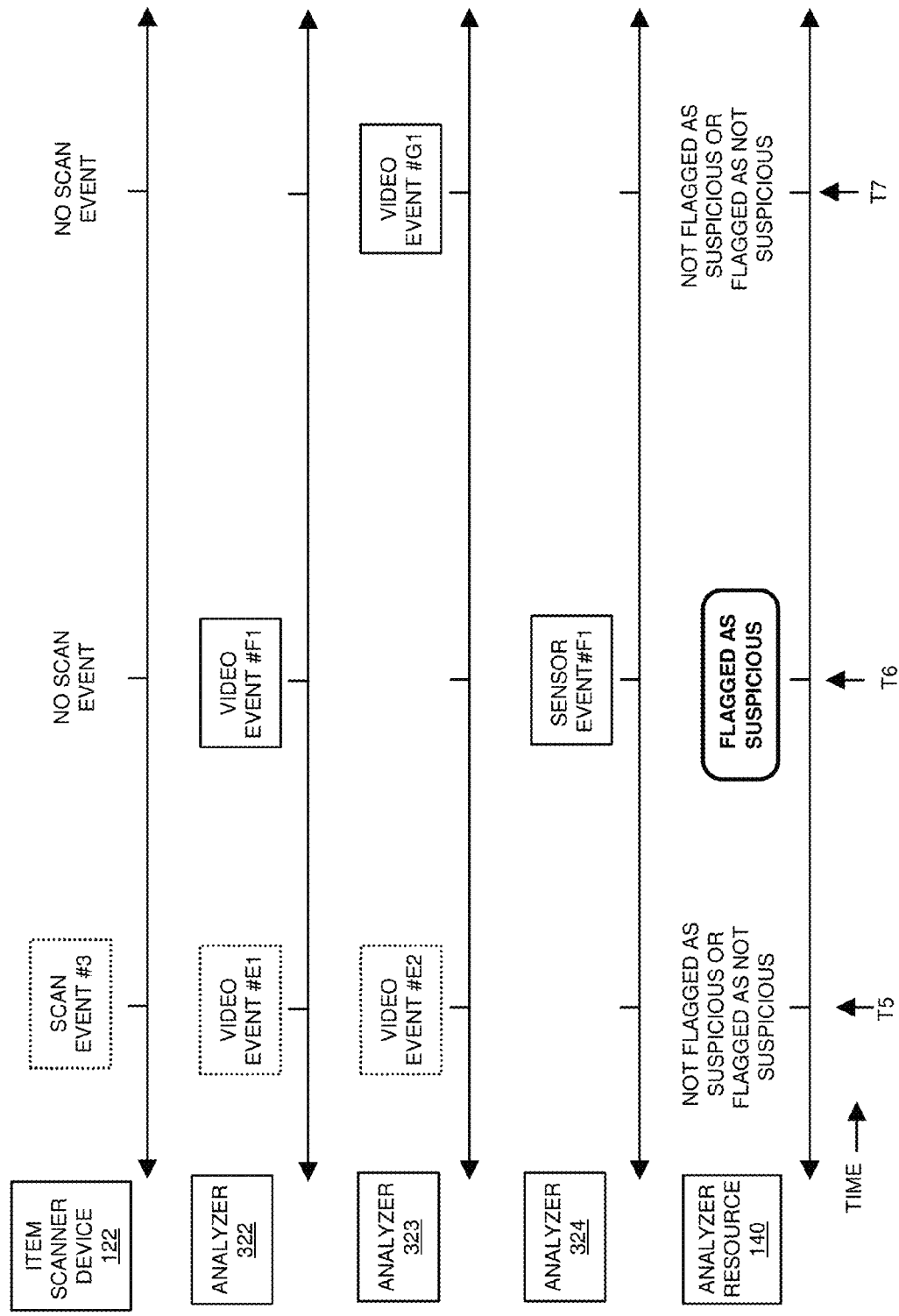

FIGS. 5 and 6 are diagrams illustrating detection of suspicious events according to embodiments herein.

In this example, assume that each analyzer analyzes a different type of event. For example, assume that the analyzer 322 monitors a first type event (e.g., motion of the operator 108-1 with respect to the item carrier apparatus 150) associated with video data 121; analyzer 323 monitors a second type of event (e.g., a count of retail items present in the item carrier apparatus 150) associated with video data 121; analyzer 324 monitors a change in the weight of retail items in the item carrier apparatus 150.

At or around time T1, the analyzer 322 monitors video data 121 and detects video event A1 (such as a specific motion of the operator 108-1 with respect to the item carrier apparatus 150); analyzer 323 monitors video data 121 and detects video event A2 (such as an increase in a count of retail items in the item carrier apparatus 150); analyzer 324 monitors sensor data 123-D and detects sensor event A1 (such as an increase in weight of retail items in the item carrier apparatus 150). In such an instance, none of these events is flagged as being suspicious because there is a corresponding scan event #1 of one or more retail items by item scanner device 122 at or around time T1. Scan event #1 indicates that the operator 108-1 scanned a respective retail item prior to placing the retail item in the item carrier apparatus 150.

At a later point in time, at or around time T2, the analyzer 322 monitors video data 121 and detects video event B1; analyzer 323 monitors video data 121 and detects video event B2; analyzer 324 monitors sensor data 123-D and detects no sensor event. Each of these detected events is potentially suspicious because there is no corresponding scan event at or around time T2. Each of the video events B1 and B2, if occurring alone may not be suspicious above a threshold value to flag the event. However, in this example embodiment, the video events B1 and B2 are flagged as being suspicious because the aggregate analyzer resource 350 detects that there is a likelihood above a threshold value that a respective retail item was placed in the item carrier apparatus 150 without being scanned. Recall that the analyzer 322 can output a probability value for video event B1. The analyzer 323 can output a probability value for video event B2. The aggregate analyzer resource 350 can be configured to sum these values and compare the resulting probability value to a threshold value. If the sum is greater than a threshold probability value, the aggregate analyzer resource 350 marks the action as being suspicious.

At a later point in time, at or around time T3, the analyzer 322 monitoring video data 121 detects video event C1. Analyzer 323 and analyzer 324 do not detect any events. For window of time associated with time T3, even though there is no scan event at or around time T2, no events are flagged as being suspicious because the single detected video event C1, in itself, is not sufficient enough evidence to flag (mark) the event as being suspicious above a threshold value.

At yet a later point in time, at or around time T4, the analyzer 322 monitoring video data 121 detects video event D1. Analyzer 323 does not detect any video events. Analyzer 324 detects sensor event D1 (e.g., an increase in weight of retail items in the item carrier apparatus 150). For window of time associated with time T4, none of these events is flagged as being suspicious because there is a corresponding scan event #2 of one or more retail items by item scanner device 122 at or around time T4. In other words, the retail items are properly scanned so the detected events are not suspicious. Scan event #2 indicates that the operator 108-1 scanned a respective retail item prior to placing the retail item in the item carrier apparatus 150.

In FIG. 6, at yet a later point in time, at or around time T5, the analyzer 322 monitoring video data 121 detects video event E1. Analyzer 323 detect video event E2. Analyzer 324 does not detect any sensor events. For window of time associated with time T5, none of these events is flagged as being suspicious because there is a corresponding scan event #3 of one or more retail items by item scanner device 122 at or around time T5. That is, scan event #3 indicates that the operator 108-1 scanned a respective retail item prior to placing the retail item in the item carrier apparatus 150.

At yet a later point in time, at or around time T6, the analyzer 322 monitoring video data 121 detects video event F1 (e.g., motion of the operator 108-1 with respect to the item carrier apparatus 150). Analyzer 323 does not detect a video event. Analyzer 324 detects sensor event F1 (such as an increase in weight of retail items in the item carrier apparatus 150). For window of time associated with time T6, the combination of events associated with a respective action are flagged as being suspicious because there is no corresponding scan event by the item scanner device 122.

At yet a later point in time, at or around time T7, the analyzer 322 monitoring video data 121 does not detect any video events. Analyzer 323 detects video event G1. Analyzer 324 does not detect any sensor events. For window of time associated with time T3, even though there is no scan event at or around time T7, no events are flagged as being suspicious because the single video event G1 is not sufficient enough evidence to flag (mark) the event as being suspicious above a threshold value.

Comparing Detection Events with TLog Data

Detecting and localizing the cart a first step in detecting possible fraudulent activity. It is done in order to extract visual events of item activity that can be compared with transaction log data in order to make a decision about whether potential loss is occurring or not. Other events can also be incorporated into any such decision making process and used either collaboratively with visual events or exclusively, on their own. For instance, availability of weight sensor data or RFID sensor data can be incorporated or used exclusively in the process. We outline below several methods of using one or more event feeds to compare against transaction log event in order to detect suspicious behavior.

In the analysis below, it is unnecessary to distinguish between visual events extracted from a visual detection process and other event feeds, such as from a weight sensor or RFID reader. They may all be incorporated together, or used in isolation. For the purposes of the discussion that follows, all event sources will be referred to as "detectors" or "sensors" (for the purposes of the discussion below, we use these two terms interchangeably) since they all contribute either exclusively or in tandem with others, to the detection of scan-avoidance.

Furthermore, this discussion regarding detectors applies not only to scan avoidance detection in the cart with mobile POS but also to more generally to scan-avoidance detection at any POS whether fixed or mobile, and whether the operator is a cashier or the shopper him/herself.

Majority Vote

In this scheme, yes/no decisions of suspicion are derived individually for each detector and then tallied up. If there are more yes's than no's, then it is deemed suspicious. The output of each of the analyzers as discussed above can indicate whether a detected event is suspicious or not. For example, analyzer 322 can produce a Boolean output value (e.g., a logic one or logic zero) to indicate whether a corresponding detected event is suspicious or not; analyzer 323 can produce a Boolean output value (e.g., a logic one or logic zero) to indicate whether a corresponding detected event is suspicious or not; analyzer 324 can produce a Boolean output value (e.g., a logic one or logic zero) to indicate whether a corresponding detected event is suspicious or not; analyzer 325 can produce a Boolean output value (e.g., a logic one or logic zero) to indicate whether a corresponding detected event is suspicious or not; and so on. The aggregate analyzer resource 350 can be configured to sum the output values for comparison to a threshold value. If the aggregate value is above a threshold value, then the corresponding activity is flagged as being suspicious.

Deriving the yes/no (i.e., Boolean) decision for each detector is context specific. For instance, for a weight sensor based detector, the decision will be based on the sensed weight and an expected weight. The expected weight, in turn, could be based on a combination of transaction log data and known information about item weights. Differences between the sensed weight and the expected weight can then be thresholded to ascertain a Boolean suspicion.

For visual detectors, the decision may be based on the number of visual events recorded versus the number of items recorded for transacting. Mismatches may indicate suspicion, and so such counts can be thresholded to ascertain a Boolean suspicion. Many other possibilities can be used however, and the previous discussion is not meant to be a limiting set.

Confidence Tally

In this scheme, suspicion rankings can be derived for each detector (i.e., sensor). The suspicion ranking can be based simple distance measures in some metric space. For instance, in the cases given above, the number thresholded to ascertain a Boolean suspicion can be used directly as the suspicion ranking. More formally, probabilistic models can be maintained and evaluation against such models of the input event data can be used as a confidence measure. For instance, a Gaussian model can be maintained for a sensor's measurement. How far away from that mean value the actual sensor measurement is (normalized for variance) gives a confidence score that can be used in the confidence tally.

Such scores can be normalized, if necessary, and summed together to derive an aggregate suspicion ranking which is then thresholded to ascertain a Boolean suspicion.

Bayesian Inference

A Bayesian analysis enables a number of advantageous properties. Proper weight or priority can be given to each detector, for instance, based on the noise characteristics of the detector. This allows an RFID sensor to be given more importance than a weight sensor, for instance, since an RFID sensor may be less noisy than a weight sensor. Formalistically, a Bayesian classification of scan-avoidance given the various detector inputs can be stated thusly:

$$P(T|D) = \frac{P(D|T)\alpha}{P(D|T)\alpha + P(D|\bar{T})(1-\alpha)},$$

Where T is a binary classification of scan-avoidance, D are the relevant events, such as visual events, weight sensor measurements, POS data events such as "skip bagging," etc., and $\alpha = P(T)$ is the prior probability of scan-avoidance occurrence.

Assuming naïve Bayes:

$$P(T|D) = \frac{\prod_i P(D_i|T)\alpha}{\prod_i P(D_i|T)\alpha + \prod_i P(D_i|\bar{T})(1-\alpha)},$$

Where each $D_i$ is an individual detector.

Under this framework, there are three values that need to be estimated: $\alpha$, $P(D_i|T)$, and $P(D_i|\bar{T})$.

The prior probability of scan-avoidance $\alpha$ can be calculated or given based on any number of methods. For instance, a retailer could conduct a whole store inventory and compare that record with sales records to measure shrink. Furthermore, loss prevention methods such as those described in U.S. Pat. No. 7,631,808 incorporated herein by this reference can be used to estimate shrink. Likewise, a value can be chosen based on industry averages, professional experience, expert knowledge, etc.

$P(D_i|\bar{T})$ is the probability of seeing detector i's output given that no scan-avoidance occurred. This can be estimated under the following common condition.

Suppose a customer scans an item and then places the item into the cart. Or, equivalently in the traditional checkout scenario, suppose the cashier picks up an item, scans it, and places it in the bag or on the output belt. In all these scenarios, a single item is manipulated and various detection methods should fire exactly once. For instance, for visual detectors operating on the input region of a traditional checkout, a detection should occur before the corresponding scan occurs. Likewise, for the case in which a visual detection algorithm operates on the output belt or in the bagging region, the detection should occur after the corresponding scan. For a weight sensor typically operating on a self-checkout unit, the weight sensor will fire off its weight estimate for the item when the item is placed into the bagging well, which occurs after its corresponding scan. For the mobile checkout system operated by the customer, the typical case will be for the customer to scan an item and place the item in the cart. A visual detection taking place inside or around the cart will occur after its corresponding scan. It should be noted that all of these methods of detection will take place before the next scan occurs. See U.S. Pat. No. 7,631,808 (which is incorporated herein by this reference) for a comprehensive treatment of scangaps and corresponding event information.

Assuming the above scenario, $P(D_i|\bar{T})$ can be estimated robustly using the abundance of normal, nonsuspicious tlog data and corresponding detector events produced on a daily basis. The result is, for each normal scangap, you will get the corresponding typical detector output. This can be modeled in any of the usual methods of probabilistic estimation techniques: Gaussian modeling, Mixtures of Gaussians, nonparametric approaches such as histogram modeling and kernel density estimation techniques, etc. The result of which is you can derive a robust generative model of detector output based on the presence of a single item.

Assuming the detector's output is IID (independent and identically distributed), $P(D_i|\bar{T})$, each detector's probability model given that a scan-avoidance is occurring, can be derived from $P(D_i|T)$. Under the scenario provided above, a necessary condition for a scan-avoidance to be occurring is when at least two items are handled during a single scangap. Assuming each detector is IID, the can be modeled as the sum of the same random variable. To compute this involves a convolution of the probability density function.

Another way to estimate each $P(D_i|T)$ is to simulate suspicious activity by combining two adjacent normal scangaps together and looking at the detection events for each $D_i$. For instance, suppose we have three items A,B, and C. These produce two scangaps A-B and B-C. If we remove item B from this sequence, we are left with one super-scangap A-C but with the detections produced by the actual existence of all items A,B, and C. This can be done for any and all scangap pairs, amounting to a sizable amount of training data for the scan-avoidance case.

Thus, it is possible to incorporate various methods of detecting the presence of one or more items under this framework. For example, one can combine detections based on visual events extract from a video analysis process and sensor signals based on weight sensors at a standard self-checkout system. What is required is to provide and maintain models of sensor performance that can be incorporated into this detection framework.

Furthermore, it should be noted that the models do not even necessarily have to be formal probabilistic constructs. Simple intuitive models loosely based on probabilistic ideas, such as those arising from sensor thresholding techniques (as described in previous sections), can be used as well with the proper forethought.

Planogram Based Loss Prevention

Another way of detecting fraudulent activity is to utilize a retail environment's planogram in order to make inferences about the items being taken by the customer. The planogram indicates a location of items in the retail environment. For instance, a store's planogram may indicate that a customer is located nearby razor blades or other valuable or highly stolen items. When a customer takes an item of merchandise and puts it in the cart, this interaction can be detected by the automated visual processing approach described previously. During or upon completion of that transaction by that customer, the system can evaluate the transaction log data for that customer's purchase to check if razor blades (or some other item which would have been nearby according to the planogram) are part of his or her transaction log. If they are not, this may be indicative of loss for the retailer.

Note that this approach is not limited to individual items, but can encompass various hierarchical subsets of items as well: the planogram may give an enumerated list of items at all locations around the store. Items may also be grouped by department, brand, etc. Any such subset, from a specific item all the way up to any item at all can be used as a potential grouping from which to compare a customer's transaction log with visual or other events detected during the course of a customer's shopping and, in the case of the use of a mobile POS product, purchasing session.

Thus, the analyzer resource 140 as discussed above can be configured to take into a location of the customer in the retail environment 100 with respect to a location of retail items on shelves in the retail environment 100 to determine whether or not a respective event is suspicious or not. For example, the analyzer resource 140 can receive item information indicating a location of different retail items available in the retail environment 100. Via video data 121, the analyzer resource 140 is able to identify that the customer passes by an item that is commonly stolen such as razor blades. The analyzer resource 140 evaluates the log of transaction data 122-D based at least in part in view of the item (location) information to determine if the video events are suspicious. In other words, the location and/or activity of a respective customer in a vicinity of razor blades can be inputted to the aggregate analyzer resource 350 as a factor to increase a probability that an overall action of the customer is suspicious.

Figure 7:
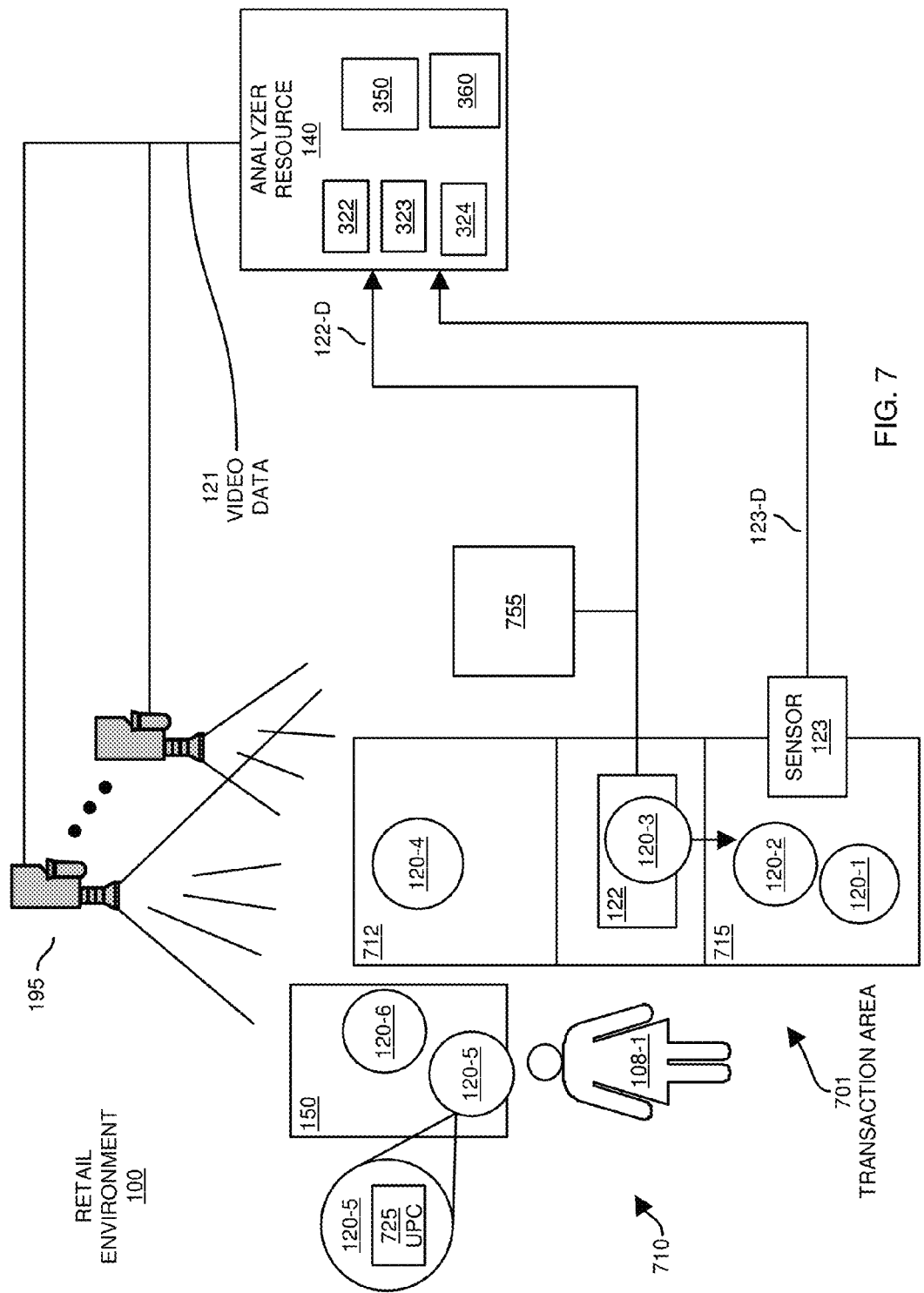
FIG. 7 is an example diagram illustrating implementation of an analyzer resource at a checkout station according to embodiments herein.

FIG. 7 is an example diagram of a retail environment according to embodiments herein.

As previously discussed, the analyzer resource 140 can be executed during mobile checkout when a respective operator 108-1 scans retail items before placement into a respective item carrier apparatus 150.

In accordance with another embodiment, the analyzer resource 140 as discussed herein in FIG. 7 can be used in a checkout lane of a respective retail environment 100. For example, subsequent to placing retail items in the item carrier apparatus 150, the operator 108-1 proceeds to a checkout station 710. In one embodiment, the checkout station 710 is a self-checkout station in which a respective customer such as operator 108-1 is trusted at the checkout station 710 to properly scan the retail items 120 via the item scanner device 122 for purchase.

Checkout station 710 can include video source 195 to capture images of the checkout transaction in transaction area 701. In this example embodiment, the analyzer resource 140 monitors and detects suspicious actions associated with checkout of retail items during checkout transaction at checkout station 710. In this instance, the operator 108-1 does not necessarily scan the retail items as they are placed in the item carrier apparatus 150. Instead, while shopping in shopping area 110 of retail environment 100, the operator 108-1 retrieves and places desired retail items in item carrier apparatus 150 and proceeds to a checkout station 710 as shown.

Checkout station 710 can be a self-checkout station operated by a respective customer purchasing retail items. Checkout station 710 also can be a standard checkout station in which an employee of the retail environment initiates scanning of retail items for purchase.

Checkout station 710 can include a transaction terminal 755 such as a point-of-sale terminal or cash register under control of operator 108-1 such as a store employee or a customer. The checkout station 710 includes an item scanner device 122 that is able to detect and scan or otherwise read identities of retail items. In one embodiment, each retail item includes a unique identifier value such as a UPC barcode symbol, RFID tags, etc., affixed to each retail item. The item scanner device 122 detects the identity of the respective retail item when they are brought within a predetermined proximity of the item scanner device 122.

In one embodiment, the customer approaches the transaction area 701 with a set of retail items 120 (e.g., retail item 120-1, retail item 120-2, retail item 120-3, retail item 120-4, . . . ) to be purchased. The retail items may be contained, for example, within item carrier apparatus 150 or other item carrier transported by the customer to the transaction area 701. Alternatively, the customer may carry the individual retail items 120 to the transaction area 701.

To purchase retail items 120, the customer removes the retail items 120 from the item carrier apparatus 150 (or from their hands if carrying the items) and places the items into an item input region 712 within the transaction area 701. The item input region 712 may be a conveyor belt, countertop, or other surface area onto which items to be purchased are placed prior to being detected and read by the item scanner device 122.

The operator 108-1 such as store employee or customer interacts with the transaction terminal by first logging in or otherwise activating the transaction terminal associated with checkout station 710. This process may involve the operator 108-1 providing a unique operator identity to the transaction terminal.

Once logged in, the operator 108-1 can begin selecting items for purchase within the item input region 712, such as by picking up the individual items by hand. The operator 108-1 passes each retail item from the item input region 712 over a viewing window of the item scanner device 122. Assuming proper (i.e., non-fraudulent and non-error) operator operation, the operator 308 positions each retail item such that the unique item type tag information (e.g., code information) affixed to the item can be detected by the item scanner device 122.

In response to the item scanner device 122 detecting an item identity 310 of the item just scanned, the transaction terminal detects, on a valid scan, the item to be purchased and usually produces a notification to the operator 108-1 such as a beeping noise or tone to indicate that the scanned retail item was successfully identified. In response to the notification, the operator 108-1 moves the scanned retail item into the item output region 715 which may be another countertop, downstream conveyor belt or the like that holds items to have been successfully scanned or read by or entered into the transaction terminal.

In one embodiment, the output region 715 includes sensor 123 to monitor output region 715. By way of a non-limiting example, the sensor can be a weight sensor configured to detect a weight of retail items placed in output region 715.

The operator 108-1 repeats this scanning process for each individual retail item such that all retail items to be purchased are moved from the item input region 712, over or through the item read region 302-2 (during which scanning of the item takes place) and into the item output region 715.

In some cases, retail items may not contain an affixed item identity 310 such as fruit, vegetables or the like. In such cases, after removal of the retail item from the item input region 712, the operator 108-1 manually enters the item identity into the transaction terminal keyboard or other manual input device to allow the transaction terminal to register the respective retail item. In this manner, after all retail items have been scanned the operator can indicate to the transaction terminal 755 that the transaction is complete. At such time, the transaction terminal calculates the total price of the scanned retail items. The customer then provides payment in that amount and proceeds to remove the items from the item output region 715 for transport out of the retail environment 100.

As previously discussed, the portion of retail environment 100 near checkout station 710 can include video sources 195 that produce video images of the checkout transaction. The video sources 195 can be mounted in an elevated position sufficiently above the transaction area 701 to cover and capture video of input region 712, item read region near item scanner device 122, output region 715, etc.

In certain instances, one or more of the retail items 120 passing from the input region 712 to the output region 715 without being properly scanned. For example, the analyzer resource 140 can receive video data 121 capturing images of the checkout transaction in which the operator 108-1 passes retail items 120 (e.g., retail item 120-1, retail item 120-2, retail item 120-3, retail item 120-4, and retail item 120-5) from the input region 712 to the output region 715 of the checkout station 710 disposed in retail environment 100. The operator 108-1 operates item scanner device 122 to detect one or more of the retail items passing from the input region to the output region 715. The analyzer resource 140 also receives a log of transaction data 122-D generated by the item scanner device 122. As mentioned, the log of transaction data 122-D itemizes at least a portion of the retail items 120 passing from the input region 712 to the output region 715.

In accordance with the one embodiment, the analyzer resource 140 also receives sensor data 123-D associated with processing of the retail items 120. The sensor data 123-D is generated from sensor hardware such as sensor 123 other than the item scanner device 122. The analyzer resource 140 analyzes the video data 121 to identify video events of the operator handling the retail items 120. The analyzer resource 140 analyzes the sensor data 123-D to identify sensor events indicative of item presence. Based on a combined analysis of the sensor events and video events, the analyzer resource 140 determines which of the multiple retail items 120 passing to the output region 715 were or were not properly detected by the item scanner device 122 for purchase.

In one embodiment, the sensor data 123-D is weight sensor data. The weight sensor data indicates a weight of items placed in the output region 715 of the checkout station 710.

Note that sensor data can be any suitable data. For example, in one embodiment, the sensor data inputted to analyzer resource 140 is RFID (Radio Frequency Identifier) tag data indicating identities of one or more items placed in the output region 715 of the checkout station 710.

In accordance with another embodiment, the sensor data inputted to analyzer resource 140 is EAS (Electronic Article Surveillance) tag deactivator data indicating identities of items placed in the output region 715 of the checkout station 710.

Any of one or more different types of sensor data can be used in conjunction with the log of transaction data 122-D and/or video data 121 to detect suspicious and non-suspicious actions.

Referring again to FIGS. 5 and 6 as item handling examples, the item scanner device 122, sensor 123, and analyzer resource 140 in transaction area 701 function in a similar manner as discussed above.

For example, assume that each of the individual analyzers in analyzer resource 140 analyzes a different type of possible event. For example, assume that the analyzer 322 monitors video data 121 to detect a first type event (such as motion of the operator 108-1 appearing to move a respective retail item from the input region 712 to the output region 715); assume that analyzer 323 monitors video data 121 to detect a second type of event (e.g., a count or identification of retail items present in the output region 715); assume that analyzer 324 monitors sensor data 123-D to detect a change in the weight of retail items in the output region 715.

At or around time T1 in FIG. 5, the analyzer 322 monitors video data 121 and detects video event A1 (such as passing of retail item 120-1 from the input region 712 to the output region 715); analyzer 323 monitors video data 121 and detects video event A2 (such as new presence of retail item 120-1 in the output region 715); analyzer 324 monitors sensor data 123-D and detects sensor event A1 (e.g., an increase in weight of retail items in the output region 715). In such an instance, none of these events is flagged as being suspicious because there is a corresponding scan event #1 of the retail item 120-1 by item scanner device 122 at or around time T1. In other words, scan event #1 as captured by log of transaction data 122-D indicates that the operator 108-1 scanned respective retail item 120-1 prior to placing the retail item 120-1 in the output region 715.

At a later point in time, at or around time T2, the analyzer 322 monitors video data 121 and detects video event B1 (such as passing of retail item 120-2 from the input region 712 to the output region 715); analyzer 323 monitors video data 121 and detects video event B2 (such as newly detected presence of retail item 120-2 in the output region 715); analyzer 324 monitors sensor data 123-D and detects no sensor event (e.g., the weight of retail items in the output region 715 does not change). Each of these detected video events is potentially suspicious because there is no corresponding scan event at or around time T2. Each of the video events B1 and B2, if occurring alone may not be suspicious above a threshold value to flag the event. However, in this example embodiment, the combined video events B1 and B2 are flagged as being suspicious because the aggregate analyzer resource 350 detects that there is a likelihood above a threshold value that a respective retail item 120-2 was not properly scanned.

At a later point in time, at or around time T3, the analyzer 322 monitoring video data 121 detects video event C1 (such as movement of the operator 108-1). Analyzer 323 and analyzer 324 do not detect any events. For example, analyzer 323 does not detect presence of retail item 120-3 in output region 715. Analyzer 324 does not detect a change in weight associated with retail items present in the out region 715. For window of time associated with time T3, even though there is no scan event at or around time T3, no events are flagged as being suspicious because the single detected video event C1, in itself, is not sufficient enough evidence to flag (mark) the event as being suspicious above a threshold value.

At yet a later point in time, at or around time T4, the analyzer 322 monitoring video data 121 detects video event D1 (such as motion of a users arm and/or passing of retail item 120-4 from the input region 712 to the output region 715). Analyzer 323 does not detect any video events. Analyzer 324 detects sensor event D1 (e.g., an increase in weight of retail items in the output region 715). For window of time associated with time T4, none of these events is flagged as being suspicious because there is a corresponding scan event #2 of the retail item 120-4 by item scanner device 122 at or around time T4. In other words, the retail item 120-4 is properly scanned at time T4 so the occurrence of detected sensor event and video event are not suspicious. Scan event #2 indicates that the operator 108-1 scanned the retail item 120-4 when passing the retail item 120-4 from the input region 712 to the output region 715.

In FIG. 6, at yet a later point in time, at or around time T5, the analyzer 322 monitoring video data 121 detects video event E1 (such as motion of a users arm and/or passing of retail item 120-5 from the input region 712 to the output region 715). Analyzer 323 detects video event E2 (such as detecting presence of retail item 120-5 in the output region 715). Analyzer 324 does not detect any sensor events (e.g., there may be no appreciable change in weight of the retail items in the output region 715). For window of time associated with time T5, the combination of these events is not flagged as being suspicious because there is a corresponding scan event #3 of retail item 120-5 by item scanner device 122 at or around time T5. That is, scan event #3 indicates that the operator 108-1 scanned retail item 120-5 prior to placing the retail item 120-5 in the output region 715.

At yet a later point in time, at or around time T6, the analyzer 322 monitoring video data 121 detects video event F1 (such as a motion of the operator 108-1 handling retail item 120-6). Analyzer 323 does not detect a video event. Analyzer 324 detects sensor event F1 (such as an increase in weight of retail items in the output region 715). For window of time associated with time T6, the combined events or corresponding action is flagged as being suspicious because there is no corresponding scan event by the item scanner device 122 for an action such as moving the retail item 120-6 from the input region 712 to the output region 715.

In this example, the handling of retail items 120-2 and 120-6 are marked as being suspicious.

As previously discussed, in one embodiment, for a monitored window of time or action, the analyzer 323 produces a first output value for a detected video event based on analysis of the video data 121. Based on analysis of the sensor data, the analyzer 324 produces a second output value for a detected sensor event. The detected sensor event and the detected video event can occur based on a particular customer action such as movement of a retail item from the input region 712 to the output region 715. The aggregate analyzer resource 350 can be configured to produce an aggregated value based on a combination of the first output value and the second output value. As mentioned, the aggregate analyzer resource 350 uses the aggregated value as a basis to determine whether the customer action is suspicious or not suspicious. In one embodiment, the aggregate analyzer resource 350 compares the aggregated value (sum of the first output value and the second output value) to a threshold value. In response to detecting that the aggregated value is greater than the threshold value, the aggregate analyzer resource 350 produces an overall output value indicating that the customer action is suspicious.

As discussed above, note again that each of the output values produced by the analyzers can be a probability value. For example, the analyzer 322 can be configured to produce a first probability value indicating a degree to which a detected video event as captured by the video data 121 is suspicious in view of monitoring a first attribute of a customer action during checkout. The analyzer 324 can be configured to produce a second probability value indicating a degree to which a detected sensor event as captured by the sensor data 123-D is suspicious in view of monitoring a second attribute of the customer action during checkout. The aggregate analyzer resource 350 can be configured to combine (such as mathematically sum) the first probability value and the second probability value under a probabilistic framework to produce an overall output value indicating a degree to which the customer action is suspicious for a non-scan event.

In accordance with further embodiments, the analyzer 323 can be configured to produce a first output value based on a comparison of the video data and the log of transaction data. As an example, if analysis of video data 121 reveals that the operator 108-1 appears to move an object from the input region 712 to the output region 715 without an item being scanned, then the analyzer 323 sets the magnitude of first output value to indicate that the detected video event is potentially suspicious. The analyzer 324 produces a second output value based on a comparison of the sensor event data and the log of transaction data 122-D. If analysis of video data 121 reveals that there is no increase in weight of retail items in the output region 715, then the analyzer 324 sets the magnitude of second output to indicate that the detected sensor event is not suspicious. In response to detecting that the aggregated value of the first output value and the second output value is below a threshold, the aggregate analyzer resource 350 produces an overall output value indicating that the customer action is not suspicious.

Additionally, the analyzer 322 can be configured to producing a first output value based on a comparison of the video data and the log of transaction data. A magnitude of the first output value can indicate that the detected video event is not suspicious. The analyzer 324 can be configured to produce the second output value based on a comparison of the sensor event data and the log of transaction data. A magnitude of the second output value can indicate that the detected sensor event is suspicious. In response to detecting that the aggregate value is below the threshold, the aggregate analyzer resource 350 produces an overall output value indicating that the corresponding customer action is not suspicious.

Figure 8:
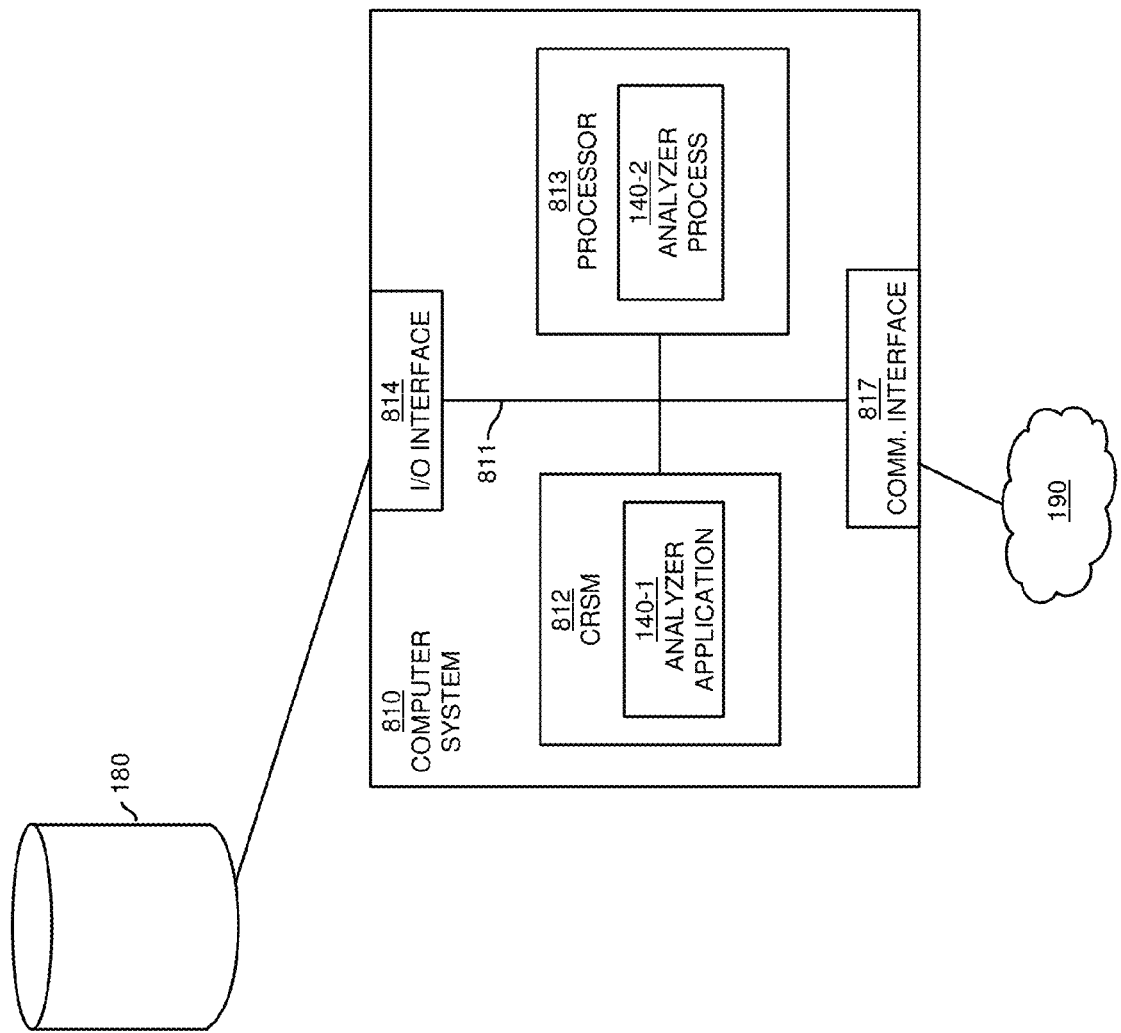
FIG. 8 is a diagram illustrating an example computer architecture for carrying out functionality according to embodiments herein.

FIG. 8 is an example block diagram of a computer system for implementing any of the operations as discussed herein according to embodiments herein.

As shown, computer system 810 of the present example can include an interconnect 811 that couples computer readable storage media 812 such as a non-transitory type of media (i.e., any type of hardware storage medium) in which digital information can be stored and retrieved, processor hardware 813 (e.g., one or more processing devices), I/O interface 814, and a communications interface 817.

I/O interface 814 provides connectivity to other resources such as repository 180.

Computer readable storage medium 812 can be any type of suitable hardware storage device such as memory, optical storage, hard drive, floppy disk, etc. In one embodiment, the computer readable storage medium 812 stores instructions and/or data.

Communications interface 817 enables the computer system 810 and processor hardware 813 to communicate over a resource such as network 190 to retrieve information from and/or transmit information to remote sources (e.g., remote processor) and communicate with other computers and/or persons. I/O interface 814 enables processor 813 to retrieve stored information from repository 180. Repository 180 can store log of transaction data, sensor data, etc.

As shown, computer readable storage media 812 is encoded with analyzer application 140-1 executed by processor 813. Analyzer application 140-1 can be configured to include instructions to implement any of the operations associated with analyzer resource 140 as discussed herein.

During operation of one embodiment, processor 813 accesses computer readable storage media 812 via the use of interconnect 811 in order to launch, run, execute, interpret or otherwise perform the instructions in analyzer application 140-1 stored on computer readable storage medium 812.

Execution of the analyzer application 140-1 produces processing functionality such as analyzer process 140-2 in processor 813. In other words, the analyzer process 140-2 associated with processor 813 represents one or more aspects of executing analyzer resource 140 within or upon the processor 813 in the computer system 810.

Those skilled in the art will understand that the computer system 810 can include other processes and/or software and hardware components, such as an operating system that controls allocation and use of hardware resources to execute the analyzer application 140-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in a retail environment or external to a retail environment to implement functionality as discussed herein.

Functionality supported by the different resources will now be discussed via flowcharts in FIGS. 9 and 10. Note that the steps in the flowcharts below can be executed in any suitable order.

Figure 9:
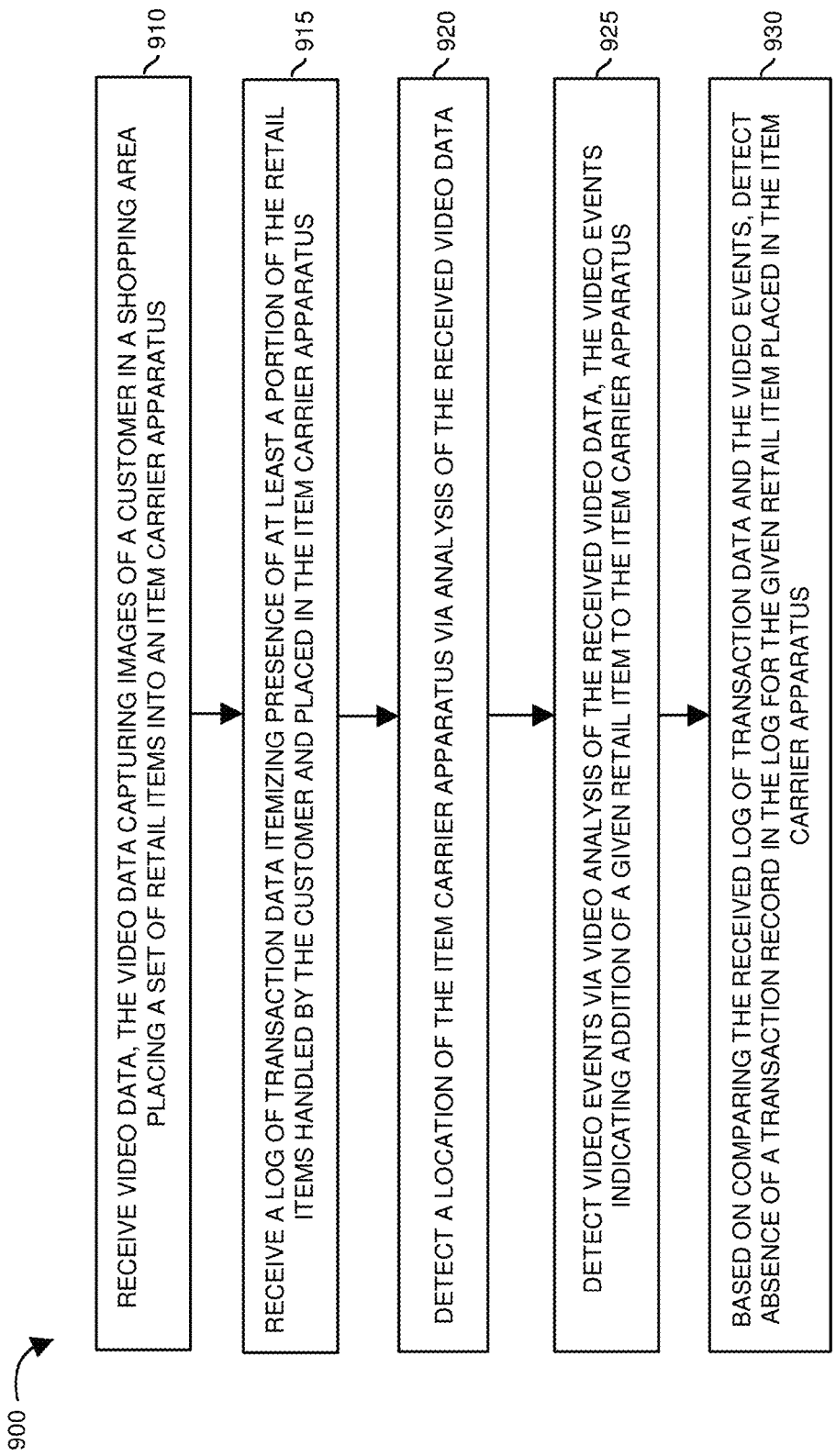
FIGS. 9 and 10 are example diagrams of methods according to embodiments herein.

FIG. 9 is a flowchart 900 illustrating an example method according to embodiments herein. Note that there will be some overlap with respect to concepts as discussed above.

In processing block 910, the analyzer resource 140 receives video data 121, the video data 121 capturing images of a customer in a shopping area 110 placing a set of retail items 120 into an item carrier apparatus 150.

In processing block 920, the analyzer resource 140 receives a log of transaction data 122-d itemizing presence of at least a portion of the retail items 120 handled by the customer and placed in the item carrier apparatus 150.

In processing block 930, the analyzer resource 140 detects a location of the item carrier apparatus 150 via analysis of the received video data 121.

In processing block 940, the analyzer resource 140 detects video events via video analysis of the received video data 121. The video events indicate addition of a given retail item to the item carrier apparatus 150.

In processing block 950, based on comparing the received log of transaction data 122-D and the video events, the analyzer resource 140 detects absence of a transaction record in the log of transaction data 122-D for the given retail item placed in the item carrier apparatus 150.

Figure 10:
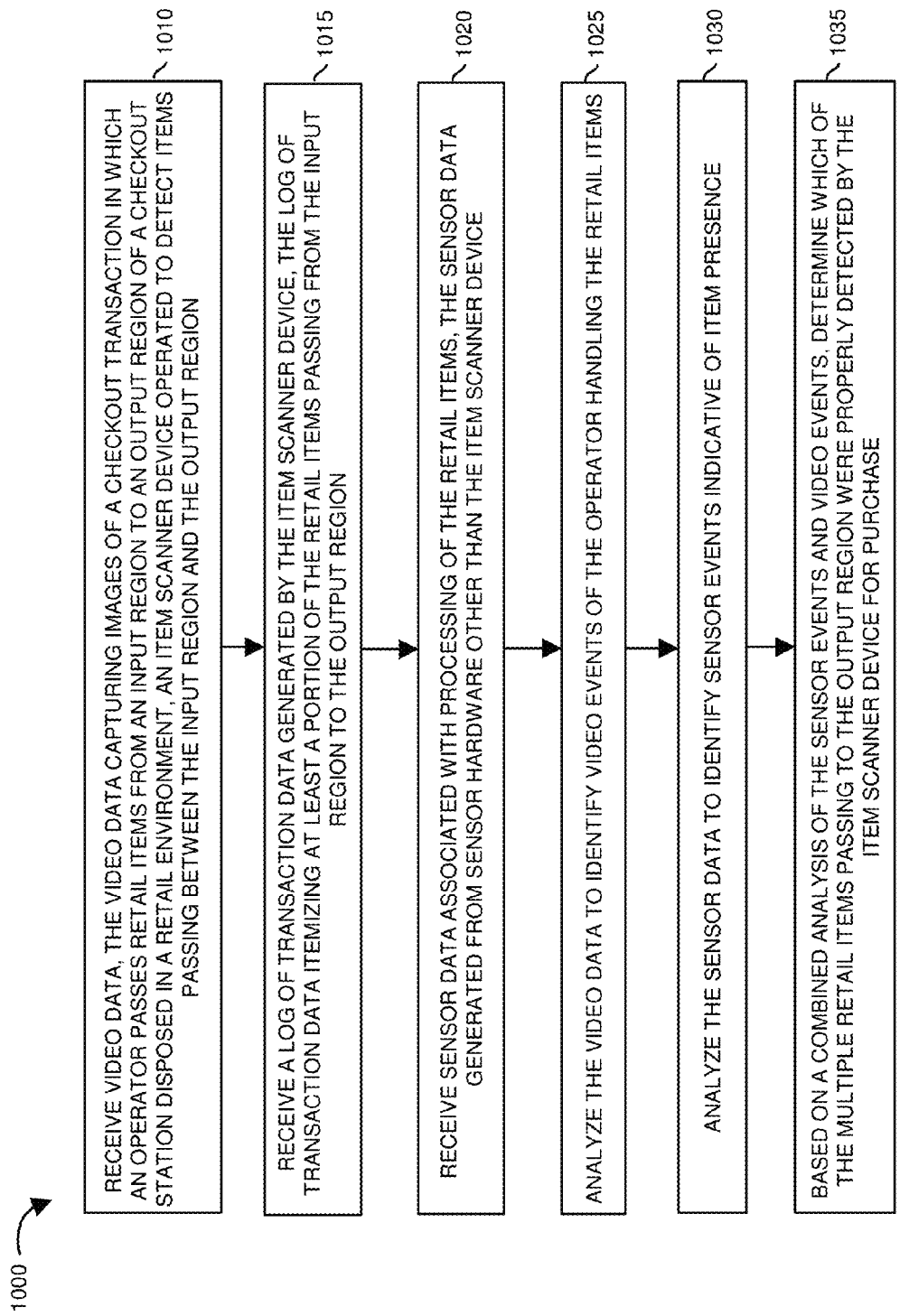

FIG. 10 is a flowchart 1000 illustrating an example method according to embodiments herein. Note that there will be some overlap with respect to concepts as discussed above.

In processing block 1010, the analyzer resource 140 receives video data 121. The video data 121 captures images of a checkout transaction in which an operator 108-1 passes retail items 120 from an input region 712 to an output region 715 of a checkout station 710 disposed in a retail environment 100. An item scanner device 122 is operated to detect items passing between the input region 712 and the output region 715.

In processing block 1015, the analyzer resource 140 receives a log of transaction data 122-D generated by the item scanner device 122. The log of transaction data itemizes at least a portion of the retail items 120 passing from the input region 712 to the output region 715.

In processing block 1020, the analyzer resource 140 receives sensor data associated with processing of the retail items 120. The sensor data is generated from sensor hardware other than the item scanner device 122.

In processing block 1025, the analyzer resource 140 analyzes the video data 121 to identify video events of the operator 108-1 handling the retail items 120. As mentioned, as an alternative to or in addition to analyzing events to identify video event of the operator 108-1 handling the retail items, embodiments herein can include analyzing the video data 121 to identify sensor events indicative of item presence. For example, an analyzed video event can be an event in which images captured by the video data 121 can indicate a video event such as a change in the number of retail items in the item carrier apparatus, etc.

In processing block 1030, the analyzer resource 140 analyzes the sensor data 123-D to identify sensor events indicative of item presence.

In processing block 1035, based on a combined analysis of the sensor events and video events, the analyzer resource 140 determines which of the multiple retail items 120 passing to the output region 715 were properly detected by the item scanner device 122 for purchase. Additionally or alternatively, in processing block 1035, based on a combined analysis of the sensor events and video events, the analyzer resource 140 can be configured to determine which of the multiple retail items 120 passing to the output region 715 were not properly detected by the item scanner device 122 for purchase.

Note again that techniques herein are well suited for use in retail environments. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computing device, comprising: a data store comprising executable software; a processor in data communication with the data store, the processor configured to execute the software and cause the computing device to:
receive video of a customer in a shopping area placing a set of retail items into an item carrier apparatus;
receive a log of transaction data itemizing presence of at least a portion of the retail items handled by the customer and placed in the item carrier apparatus;
detect a location of the item carrier apparatus via analysis of received video data of invisible markings affixed to the item carrier apparatus that are detectable in the received video data but not by the customer, the invisible markings comprising material reflective in the infrared spectrum;
detect video events via video analysis of the received video data of invisible markings affixed to the item carrier apparatus that are detectable in the received video data but not by the customer, the video events indicating addition of a given retail item to the item carrier apparatus; and
based on comparing the received log of transaction data and the video events, detect absence of a transaction record in the log for the given retail item placed in the item carrier apparatus;
wherein receiving the log of transaction data includes:
in the computer system, receiving scanning information from an item scanner device operated by the customer, the customer using the item scanner device to scan each item in the portion of retail items placed into the item carrier apparatus, the customer failing to properly scan the given retail item placed in the item carrier apparatus; and
wherein detecting absence of the transaction record in the log for the given retail item further comprises:
in the computer system, based on analyzing the images, detecting a particular video event capturing placement of the given retail item in the item carrier apparatus by the customer; and
in the computer system, failing to find presence of the transaction record in the log corresponding to the particular video event around the time when the given retail item was placed in the item carrier apparatus.

2. The computing device as in claim 1 wherein the processor configured to execute the software further causes the computing device to:
receive item information indicating a location of different retail items available in the retail environment; and
evaluate the log of transaction data in view of the item information to determine if the video events are suspicious.

3. The computing device as in claim 1 wherein the processor configured to execute the software further causes the computing device to:
receive sensor data associated with placing of the set of retail items into the item carrier apparatus, the sensor data generated by sensor hardware other than an item scanner device used by the customer to produce the log of transaction data;
analyze the sensor data to detect sensor events; and in the computer system, based on a combined analysis of the video events and the sensor events, confirm that the activity is suspicious.

4. The computing device as in claim 3 wherein the processor configured to execute the software further causes the computing device to:
produce a first output value for a detected video event;
produce a second output value for a detected sensor event;
produce an aggregated value based on a combination of the first output value and the second output value; and
based on comparison of the aggregated value to a threshold value, produce an overall output value indicative of whether a customer action corresponding to the detected video event and the detected sensor event is suspicious.

5. The computing device as in claim 1 wherein the processor configured to execute the software further causes the computing device to:
in response to detecting the absence of the transaction record in the log for the given retail item placed in the item carrier apparatus, send an alert to a receiving device.

6. The computing device as in claim 3 wherein the processor configured to execute the software further causes the computing device to:
produce a first probability value indicating a degree to which a detected video event as captured by the video data is suspicious in view of monitoring a first attribute of a customer action in the shopping area;
produce a second probability value indicating a degree to which a detected sensor event as captured by the sensor data is suspicious in view of monitoring a second attribute of the customer action in the shopping area;
combine the first probability value and the second probability value under a probabilistic framework to produce an output value, the output value indicating a degree to which the customer action is suspicious.

7. A system comprising:
processor hardware;
a storage resource that stores instructions associated with an application executed by the processor hardware; and
an interconnect coupling the processor hardware and the storage resource, the processor hardware executing the application and performing operations of:
receiving video data of a customer in a shopping area placing a set of retail items into an item carrier apparatus;

receiving a log of transaction data itemizing presence of at least a portion of the retail items handled by the customer and placed in the item carrier apparatus;

detecting a location of the item carrier apparatus via analysis of received video data of invisible markings affixed to the item carrier apparatus that are detectable in the received video data but not by the customer, the invisible markings comprising material reflective in the infrared spectrum;

detecting video events via video analysis of the received video data of the invisible markings affixed to the item carrier apparatus that are detectable in the received video data but not by the customer, the video events indicating addition of a given retail item to the item carrier apparatus; and based on comparing the received log of transaction data and the video events, detecting absence of a transaction record in the log for the given retail item placed in the item carrier apparatus;

wherein receiving the log of transaction data includes:

in the computer system, receiving scanning information from an item scanner device operated by the customer, the customer using the item scanner device to scan each item in the portion of retail items placed into the item carrier apparatus, the customer failing to properly scan the given retail item placed in the item carrier apparatus; and wherein detecting absence of the transaction record in the log for the given retail item further comprises:

in the computer system, based on analyzing the images, detecting a particular video event capturing placement of the given retail item in the item carrier apparatus by the customer; and in the computer system, failing to find presence of the transaction record in the log corresponding to the particular video event around the time when the given retail item was placed in the item carrier apparatus.

8. The device of claim 1 wherein the log of transaction data includes a detected weight based on a change in a total detected weight of retail items in the item carrier apparatus.

9. The device of claim 8 further comprising a weight sensor in the item carrier apparatus for detecting absence of the transaction record for the retail item includes an increase in detected weight greater than a weight of the retail item based on the scan.

* * * * *